United States Patent
Feria

(10) Patent No.: US 10,101,445 B2
(45) Date of Patent: Oct. 16, 2018

(54) POWER CENTROID RADAR

(71) Applicant: Research Foundation of the City University of New York, New York, NY (US)

(72) Inventor: Erlan Feria, Princeton, NJ (US)

(73) Assignee: Research Foundation of the City University of New York, New York, NY (US)

( * ) Notice: Subject to any disclaimer, the term of this patent is extended or adjusted under 35 U.S.C. 154(b) by 727 days.

(21) Appl. No.: 14/699,335

(22) Filed: Apr. 29, 2015

(65) Prior Publication Data

US 2018/0074184 A1  Mar. 15, 2018

Related U.S. Application Data

(60) Provisional application No. 61/985,783, filed on Apr. 29, 2014.

(51) Int. Cl.

| G01S 7/292 | (2006.01) |
| G01S 13/524 | (2006.01) |
| G01S 7/295 | (2006.01) |
| G01S 7/34 | (2006.01) |

(52) U.S. Cl.
CPC .......... *G01S 13/5242* (2013.01); *G01S 7/292* (2013.01); *G01S 7/295* (2013.01); *G01S 7/2925* (2013.01); *G01S 7/34* (2013.01)

(58) Field of Classification Search
CPC . G01S 7/292; G01S 7/295; G01S 7/34; G01S 7/414; G01S 13/5242; G01S 13/5244; G01S 13/5246; G01S 13/526; G01S 13/53; G01S 13/534
See application file for complete search history.

(56) References Cited

U.S. PATENT DOCUMENTS

| 2,811,715 A | 10/1950 | Baker |
| 2,965,895 A | 5/1951 | Blasingame et al. |
| 3,634,859 A | 1/1972 | Wolf et al. |
| 3,727,220 A | 4/1973 | Brennan et al. |
| 3,781,882 A | 12/1973 | Holberg |
| 3,879,729 A | 4/1975 | Nevin |
| 3,962,704 A | 6/1976 | Evans |
| 4,720,712 A * | 1/1988 | Brookner ............. H01Q 3/2617 342/383 |

(Continued)

FOREIGN PATENT DOCUMENTS

| DE | 3639500 | 6/1988 |
| WO | 2004077093 | 9/2004 |

*Primary Examiner* — Peter M Bythrow
(74) *Attorney, Agent, or Firm* — Peter J. Mikesell; Schmeiser, Olsen & Watts, LLP

(57) ABSTRACT

A system for signal processing is provided that obviates the use of prior-knowledge, such as synthetic aperture radar (SAR) imagery, in time compressed signal processing (i.e. it can be knowledge unaided). The knowledge-unaided power centroid ($PC_{KU}$) is found by evaluating a covariance matrix $R_{SCM}$ for its moments $m_i$. Because $R_{SCM}$ uses a sample signal, rather than SAR data, the power centroid $PC_{KU}$ may be found without needing SAR data.

14 Claims, 15 Drawing Sheets

(56) References Cited

U.S. PATENT DOCUMENTS

| | | | |
|---|---|---|---|
| 5,341,142 A | 8/1994 | Reis et al. | |
| 5,602,760 A | 2/1997 | Chacon et al. | |
| 5,617,099 A * | 4/1997 | Warren | G01S 13/5244 342/159 |
| 5,760,734 A * | 6/1998 | Urkowitz | G01S 7/414 342/159 |
| 5,907,568 A | 5/1999 | Reitan, Jr. | |
| 6,292,592 B1 * | 9/2001 | Braunreiter | G01S 3/7864 342/90 |
| 6,400,306 B1 * | 6/2002 | Nohara | G01S 13/5244 342/160 |
| 6,600,446 B2 | 7/2003 | Moch | |
| 7,009,533 B1 | 3/2006 | Wegener | |
| 7,145,971 B2 | 12/2006 | Raleigh et al. | |
| 7,415,065 B2 | 8/2008 | Sud et al. | |
| 7,773,032 B2 * | 8/2010 | Feria | G01S 7/295 342/159 |
| 7,903,024 B2 | 3/2011 | Tietjen | |
| 8,098,196 B2 * | 1/2012 | Feria | G01S 7/295 342/159 |
| 9,772,402 B2 * | 9/2017 | Schuman | G01S 13/5244 |
| 2001/0027392 A1 | 10/2001 | Wiese, Jr. | |
| 2002/0152253 A1 * | 10/2002 | Ricks | H03H 21/0012 708/520 |
| 2005/0027519 A1 | 2/2005 | Li et al. | |
| 2005/0237236 A1 * | 10/2005 | Budic | G01S 7/414 342/159 |
| 2005/0280571 A1 * | 12/2005 | Abatzoglou | G01S 13/9029 342/25 B |
| 2006/0039626 A1 | 2/2006 | Nakayama | |
| 2006/0181451 A1 * | 8/2006 | Samson, Jr. | G01S 7/2813 342/160 |
| 2006/0220956 A1 * | 10/2006 | Richardson | G01S 7/2813 342/375 |
| 2007/0285315 A1 * | 12/2007 | Davis | G01S 3/74 342/377 |
| 2009/0322612 A1 * | 12/2009 | Feria | G01S 7/295 342/373 |
| 2010/0019957 A1 * | 1/2010 | Feria | G01S 7/295 342/25 F |
| 2011/0241931 A1 * | 10/2011 | Krich | G01S 7/2813 342/159 |
| 2012/0062409 A1 * | 3/2012 | Pun | G01S 7/292 342/27 |
| 2012/0127027 A1 * | 5/2012 | Sahinoglu | G01S 13/5242 342/189 |
| 2012/0249361 A1 * | 10/2012 | Sahinoglu | G01S 7/292 342/159 |
| 2012/0256787 A1 * | 10/2012 | Suzuki | G01S 7/292 342/189 |
| 2012/0268325 A1 * | 10/2012 | Hansen | G01S 3/32 342/373 |

* cited by examiner

POWER CENTROID RADAR

CROSS-REFERENCE TO RELATED APPLICATIONS

This application claims priority to and is a non-provisional of U.S. Patent Application Ser. No. 61/985,783 (filed Apr. 29, 2014) the entirety of which is incorporated herein by reference.

BACKGROUND OF THE INVENTION

The subject matter disclosed herein relates to an intelligent system (IS) that uses a knowledge-aided (KA) airborne moving target indicator (AMTI) radar such as found in DARPA's knowledge aided sensory signal processing expert reasoning (KASSPER).

I. Power Centroid Radar

Power centroid radar (PC-Radar) is a fast and powerful adaptive radar scheme that naturally surfaced from the recent discovery of the time-dual for information theory which has been named "latency theory." See U.S. Pat. Nos. 7,773,032 and 8,098,196, the content of which are hereby incorporated by reference. This method uses a predetermined number of predicted clutter covariance signal values found from, for example, a specified number of possible power centroid quantization levels. The method uses a knowledge-aided power centroid ($PC_{KA}$) that is calculated based on clutter for SAR imagery. As described, because $PC_{KA}$ is based on predetermined SARS data the observed value of $\theta_t$ may be compressed using $\theta_t = \theta^{Q[PC_{KA}]}$ using off-line computations.

The intelligent system comprises a memory device containing the intelligence or prior knowledge. The intelligence is clutter whose knowledge facilitates the detection of a moving target. The clutter is available in the form of synthetic aperture radar (SAR) imagery. Since the required memory space for SAR imagery is prohibitive, it then becomes necessary to use 'lossy' memory space compression source coding schemes to address this problem of memory space. An improved system is therefore desired.

The discussion above is merely provided for general background information and is not intended to be used as an aid in determining the scope of the claimed subject matter.

BRIEF DESCRIPTION OF THE INVENTION

A system for signal processing is provided that obviates the use of prior-knowledge, such as synthetic aperture radar (SAR) imagery, in time compressed signal processing (i.e. it can be knowledge unaided). The knowledge-unaided power centroid ($PC_{KU}$) is found by evaluating a covariance matrix $R_{SCM}$ for its moments $m_i$. Because $R_{SCM}$ uses a sample signal, rather than SAR data, the power centroid $PC_{KU}$ may be found without needing SAR data.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which.

DETAILED DESCRIPTION OF THE INVENTION

Figure 1:
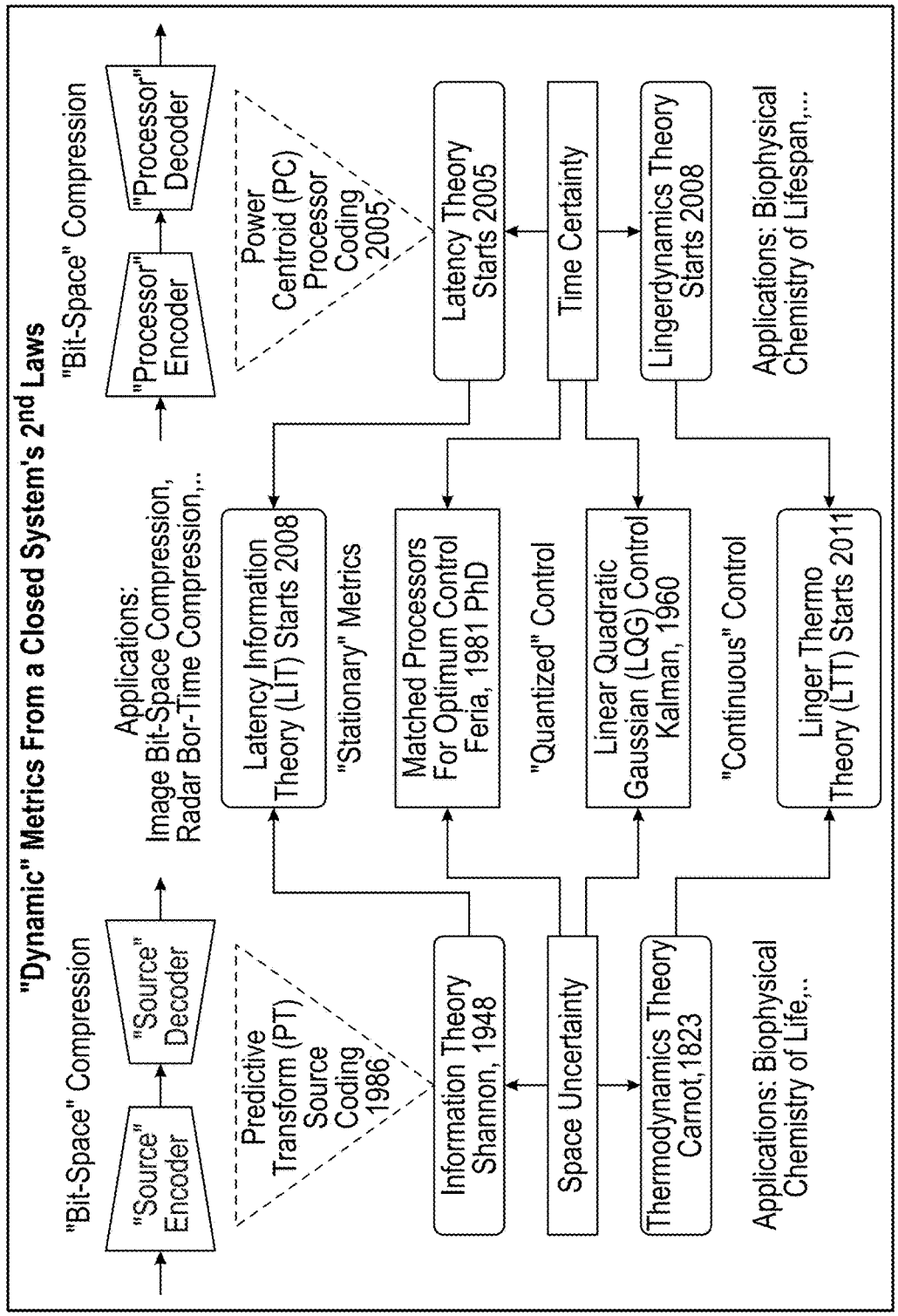
FIG. 1 is the time dual of Information Theory's Source Coding.

The subject matter disclosed herein relates to a system for signal processing that obviates the use of prior-knowledge, such as synthetic aperture radar (SAR) imagery in time compressed signal processing (i.e. it can be knowledge unaided). The disclosed system solves the problem of jointly compressing storage-space and computational-time associated with the evaluation of high dimensional clutter covariance matrices. Applications of the algorithm are found in radar system and in other fields, such as cognition problems and ratio.

The method described here provides an alternate method for calculating a knowledge-unaided power centroid ($PC_{KU}$)

that obviates the need for SARS data. The knowledge-unaided power centroid ($PC_{KU}$) may then be used in accordance with the teachings of U.S. Pat. Nos. 7,773,032 and 8,098,196.

The knowledge-unaided power centroid ($PC_{KU}$) is found by evaluating a sample covariance matrix $R_{SCM}$ for its moments $m_i$. Because $R_{SCM}$ uses a sample signal, rather than SAR data, the power centroid $PC_{KU}$ may be found without needing SAR data.

Latency theory itself was born from the universal cybernetics duality (UC-Duality) that has also delivered a time dual for thermodynamics that has been named "lingerdynamics." The development of PC-Radar started with Defense Advanced Research Projects Agency (DARPA) funded research on knowledge-aided (KA) adaptive radar of the last decade. The outstanding signal to interference plus noise ratio (SINR) performance of PC-Radar under severely taxing environmental disturbances will be established. More specifically, it will be seen that the SINR performance of PC-Radar, either KA or knowledge-unaided (KU), approximates that of an optimum KA radar scheme. The explanation for this remarkable result is that PC-Radar inherently arises from the UC-Duality, which advances a "first principles" duality guidance theory for the derivation of synergistic storage-space/computational-time compression solutions. Real-world synthetic aperture radar (SAR) images will be used as prior-knowledge to illustrate these results.

Radar uses radio waves to find the range, altitude, direction, or speed of objects. Its applications are widespread such as in defense, space, commercial and medical investigations of tissue, heart and respiratory states. In demanding applications, such as in moving target indicator (MTI) radar for ground or airborne targets, its performance can be significantly degraded by interference and thermal white noise. The interference can be of various kinds such as clutter, jammer, range walk, channel mismatch, internal clutter motion and antenna array misalignments. Thus in these applications adaptive radar systems are designed that address any changes that may occur in the operating environment. Of the aforementioned interference types, clutter, which are returns from the range-bin where a target is being investigated, is without doubt the one most difficult to adapt to.

To attend to the clutter problem two basic approaches are used in adaptive radar. One approach is knowledge-unaided (KU), i.e., prior-knowledge about the clutter is not used, and this leads to simple radar schemes but with a marginal SINR performance, and the other is knowledge-aided (KA) that leads to a superior SINR radar performance but with significant implementation complexities. The standard KU radar scheme is sample covariance matrix radar (SCM-Radar). In KU SCM-Radar clutter samples are used from the range-bin where a target is being investigated, as well as its close-by neighbors, in order to find the clutter covariance matrix. Unfortunately, however, the SINR performance derived with KU SCM-Radar is often marginal since it is only satisfactory when the clutter has stationary statistics, which is seldom the case. The second KA approach uses prior-knowledge such as synthetic aperture radar (SAR) imagery of range-bin locations that the radar system may investigate. KA radar techniques of this kind were developed, for instance, under a Defense Advanced Research Projects Agency (DARPA) KA Sensory Signal Processing and Expert Reasoning (KASSPER) program. The KASSPER schemes were applied to ground moving target indicator (GMTI) applications. Although some of the radar schemes could yield a superior SINR radar performance their designs were subjected to severe constraints. One was the daunting storage-space needs of SAR-imagery and another was the extreme computational-time burden of on-line clutter-covariance matrix evaluations. Another important limitation was the absence of a "first-principles" guiding theory for radar designs that would inherently lead to fast and powerful synergistic storage-space/computational-time compression solutions.

Radar schemes have been developed that are not radar blind, which clearly complicates the radar system implementations. In turn this realization led to a search for a guiding theory for radar design in the universal cybernetics duality (UC-Duality). A fast and powerful synergistic storage-space/computational-time compression radar solution surfaced. This solution was power-centroid (PC) radar (PC-Radar) whose SINR performance emulates that of an optimum scheme, referred here as Optimum-Radar, that uses covariance matrix tapers to model the interference plus noise covariance. PC-Radar was at first KA. Investigations of Linear Quadratic Gaussian Control (LQG-Control) lead to the UC-Duality hypothesis. The UC-Duality revelation was that, "Synergistic physical/mathematical dualities naturally arise in efficient system designs"

KA adaptive radar design issues served as the catalyst to the discovery of Latency Theory and Lingerdynamics Theory as time-certainty duals for space-uncertainty Information Theory and Thermodynamics Theory, respectively. In turn, these theories led to the synergistic Latency Information Theory (LIT) and Linger Thermo Theory (LTT). These two theories addressed four different types of system functions. The four were: 1) a "source" uncertainty function measured by a source entropy space-metric (this metric is the Shannon's "info-source" entropy in LIT and the Boltzmann's "thermo-source" entropy in LTT); 2) a "processor" certainty function measured by a novel processor ectropy time-metric; 3) a "retainer" uncertainty function measured by a novel retainer entropy space-metric; and 4) a "mover" certainty function measured by a novel mover ectropy time-metric. Yet the nature of the LIT and LTT space/time metrics were quite different. In the case of LIT they were time invariant, or stationary in nature, while in the LTT case they were time varying, or dynamic in nature. The LTT dynamic property has roots in one of the four laws of thermodynamics that drive the universe, (more specifically, the $2^{nd}$ law of thermodynamics) that states that the Boltzmann entropy (or equivalently the thermo-source entropy space-metric) increases with time for a closed system. It can be shown that similar increases occur to the remaining LTT space/time metrics with the passing of time. In Appendix C a brief outline for LTT is given where the basic ideas are illustrated with black-hole, photon-gas and flexible-phase mediums. Moreover, for the flexible-phase medium it is shown that an entropy theory inherently emerges from LTT in a sensible and compelling manner.

PC-Radar emerged from Latency Theory's Processor Coding, see top of FIG. 1, which is the time dual of Information Theory's Source Coding. While a source coder such as a predictive transform (PT) one, aims for high "bit-space compressions", a processor coder such as a power centroid (PC) one, aims for high "bor-time compressions", i.e., the smallest possible number of binary operator (or bor) levels from processor input to output.

In PC-Radar a processor encoder followed by a processor decoder derives the front clutter covariance matrix ($C_c^f$ ($\theta_{AAM}$)), that is also a function of any existing antenna array misalignment angle $\theta_{AAM}$ as noted in Section II. The objective of the encoder is to measure the power-centroid (PC) of the clutter emanating from the front range-bin displayed in FIG. 2. This figure shows the physical antenna pattern (PAP) for a phased array antenna of a moving target indicator or MTI that is directed towards an investigated target on the front range-bin. In a symmetrical stationary-clutter scenario the range-bin PC location would be the same as where the PAP points.

More specifically, the "physical duality" conveyed the separation of the system design into a space-uncertainty communication problem and a time-certainty control problem, while the "mathematical duality" conveyed the appearance of identical mathematical structures in the separately designed communication/control subsystems. In turn this revelation led to "Matched Processors (MPs) for Optimum Control". While LQG-Control dealt with continuous control, MPs-Control dealt with quantized control. In MPs-Control the certainty-based parallel structures of the Matched Processors controller was the control's certainty-based dual of communication's uncertainty-based parallel structures of Matched-Filters for bit detection. A remarkable result of MPs-Control was that unlike Bellman's Dynamic Programming, it did not suffer of what Bellman called "the curse of dimensionality" when referring to the exponential increase in computational burden as the process state dimension increased in value.

On the other hand, the objective of the decoder is to use the measured PC to select a $C_c^f(\theta_{AAM})$ realization from a stored set, where the elements of the set are evaluated off-line and are matched to unique range-bin PC and $\theta_{AAM}$ quantization levels. The best matched $C_c^f(\theta_{AAM})$ is then used in an interference plus noise covariance (R) expression, see the bottom of FIG. 2, that is modeled with covariance-matrix-tapers that contains the other back-clutter ($C_c^b$ ($\theta_{AAM}$), jammer ($C_J$), range-walk ($C_{RW}$), internal-clutter-motion ($C_{ICM}$), channel-mismatch ($C_{CM}$) and thermal-noise ($C_n$) covariance cases (in Sections II and Appendix A the mathematical models for these much easier to find covariances are reviewed). As is seen later in Section II the inverse of R is then multiplied by the target steering vector (s) to yield the radar weighting gain (w) resulting in a superior SINR radar performance.

Both KA and KU PC-Radar are found to emulate the SINR performance of Optimum-Radar. The explanation for this exceptional result is the use of "mathematical antenna patterns" (MAPs) in the off-line evaluation of the $C_c^f(\theta_{AAM})$ set. More specifically, when $C_c^f(\theta_{AAM})$ is evaluated off-line, the PAP appearing in its covariance matrix definition is replaced with a MAP that points towards its matched PC value. In this way the MAP acts as a control compensator for non-stationary clutter PC measurements that deviate from the PAP pointing direction. When the PC processor-decoder receives a quantized PC, either from KA or KU measurements, also an appropriate $\theta_{AAM}$ level, it then retrieves from its memory the $C_c^f(\theta_{AAM})$ case that matches them.

Under severely taxing environmental conditions (as will be seen later in Section IV) PC-Radar yields outstanding SINR results, even if only a few quantization levels are used for the PC. For the KA case it also offers a significant implementation advantage since "radar-blind" image compression of SAR imagery is now possible. Moreover, in the KU case the power centroid is derived directly from a sample covariance matrix. This result is remarkable since with a very simple KU scheme PC-Radar approaches the SINR performance of Optimum-Radar.

The exposed synergistic PC-Radar ideas described herein find extensive use in fields such as smart antennas, with applications not only found in radar but also in radio communications where non-stationary clutter interferences are the rule rather than the exception as the complexity and demands of wireless multi-media networks continuously increase.

II. The MTI Radar Problem

As noted earlier the key to a superior SINR radar performance while subjected to intense interference plus noise disturbances is to dynamically adjust the radar system parameters as the disturbance characteristics change with location. A system using such adaptation is the MTI radar system of FIG. 2. The statement of the radar problem for a MTI radar system is presented in this section in seven subsections starting with the six interference types previously alluded to.

A. Six Interference Types

'Range Walk (RW)'.

This type of interference is due to the movement of the radar platform during a coherent pulse interval (CPI). The CPI denotes the time delay associated with the transmission of M pulses by N antenna elements of the "phased array antenna" assumed in our MTI radar model. The product of N and M, i.e., NM, represents the degrees of freedom (DoF) of the radar system. This number is also the assumed number of cells for the investigated range-bin displayed in FIG. 2. The covariance matrix for range walk is studied in Appendix A where expressions (A.9)-(A.12) define it.

Figure 2:
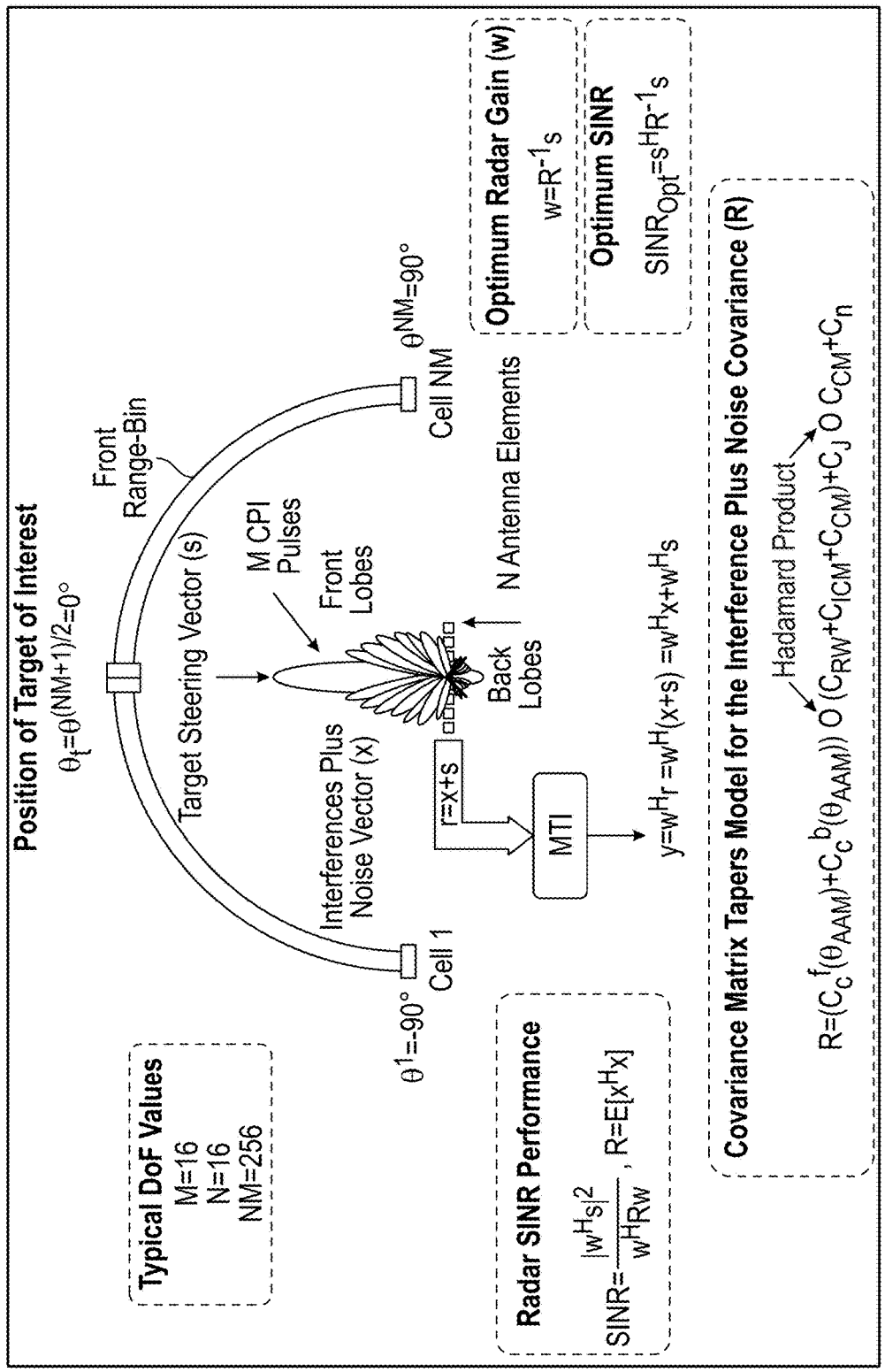
FIG. 2 is block diagram of a signal decoder.

Clutter (c):

These are antenna gain weighted returns from the range-bin where the appearance of a target is being investigated at boresight as seen in FIG. 2. For the physical antenna pattern or PAP emerging from N antenna elements the gain is designed to be high for the front-lobes and low for the back-lobes. Thus the clutter collected by the radar from the back range-bin cells is insignificant when compared to that collected from the front range-bin cells. The covariance matrix for the front clutter will be studied later with expressions (18)-(26) defining it.

Jammer (J):

These are emissions emanating from range-bin cells that attempt to disrupt radar searches. The covariance matrix for jammer is studied in Appendix A where expressions (A.2)-(A.8) define it.

Internal Clutter Motion (ICM):

This interference describes a change in the range-bin clutter that may occur during the CPI. The covariance matrix for internal clutter motion is studied in Appendix A where expressions (A.13)-(A.16) define it.

Channel Mismatch (CM):

These are signal channel mismatches whose origin can be 'angle dependent', 'angle independent narrowband' and 'finite bandwidth'. The covariance matrix for channel mismatch is studied in Appendix A where expressions (A.17)-(A.29) define it.

Antenna Array Misalignment Angle ($\theta_{AAM}$):

This is an antenna misalignment angle whose value impacts the evaluation of the steering vectors linked to each range-bin cell.

B. Major Radar Signals

There are two major complex signals that are received by the MTI, with both being NM dimensional. One signal is the normalized steering vector (s) of the target of interest and the other is the interference plus noise vector (x). These two signals are added up to form the total received signal (r) defined according to:

$$r = x + s \qquad (1)$$

It is then the task of the MTI to multiply this received signal by a complex weighting vector (w) of dimension NM to yield an scalar output (y) whose value is then used to determine if a target has been received or not. Thus one derives $$y = w^H r = w^H(x+s) = w^H x + w^H s \quad (2)$$

where $w^H s$ is the signal contribution and $w^H x$ is the interference plus noise contribution to y. Note that 'H' denotes a vector complex conjugate transposition, i.e., a Hermitian transpose. The derivation of the gain w is discussed next.

C. The Performance Metric

In the radar system design one aims to find an expression for w that maximizes the ratio of the signal power $|w^H s|^2$ to the expected interference plus noise power $E[w^H x x^H w] = w^H E[x x^H] w = w^H R w$. In this way the relative signal contribution to the amplitude of y will be the largest possible when a target appears on the investigated range-bin location. The objective is then to maximize the SINR expression given by $$\text{SINR} = |w^H s|^2 / w^H R w \quad (3)$$

$$R = E[x x^H] \quad (4)$$

with R denoting a complex NM×NM interference plus noise covariance matrix. The maximization of (3) then results in the well-known Wiener-Hopf equation for the optimum gain (w*) expression according to:

$$w^* = R^{-1} s \quad (5)$$

Associated with (5) one then derives the optimum SINR (SINR*) according to:

$$\text{SINR}^* = s^H R^{-1} s \quad (6)$$

The covariance matrix tapers model is then used for the interference plus noise covariance matrix (R).

The Interference Plus Noise Covariance Model:

The study of the aforementioned six interference cases in the context of R yields the following covariance matrix tapers model for R:

$$R = (C_c^f(\theta_{AAM}) + C_c^b(\theta_{AAM})) \odot (C_{RW} + C_{ICM} + C_{CM})$$
$$C_f \odot C_{CM} + C_n \quad (7)$$

$$C_{CM} = C_{AD} + C_{AIN} + C_{FB} \quad (8)$$

where: 1) $C_c^f(\theta_{AAM})$ and $C_c^b(\theta_{AAM})$ are complex NM×NM front and back clutter covariances that are functions of the antenna array misalignment angle $\theta_{AAM}$; 2) $C_{AD}$, $C_{AIN}$, $C_{FB}$ are composite and complex NM×NM "angle dependent (AD)", "angel independent narrowband (AIN)" and "finite bandwidth (FB)" channel mismatch covariances, respectively, that are added to yield the total channel mismatch covariance $C_{CM}$, see Appendix A; 3) $C_{RW}$ is a complex NM×NM range walk covariance, see Appendix A; 4) $C_{ICM}$ is a complex NM×NM internal clutter motion covariance, see Appendix A; 5) $C_n$ is a NM×NM thermal noise covariance, see Appendix A; and 6) the symbol "$\odot$" denotes Hadamard term by term products of the elements of two matrices.

The mathematical expressions defining the target steering vector (s), the antenna pattern for a uniform linear array (ULA) and the front clutter covariance matrix $C_c^f(\theta_{AAM})$ are given next. As noted earlier the definition for the remaining covariances in the R expressions (7)-(8) are as defined in Appendix A. In our later simulations the values for these matrices are assumed to be either known or of zero value as is the case for the back clutter covariance matrix $C_c^b(\theta_{AAM})$. Next the mathematical model for the target signal is noted.

E. The Target Return

The MTI system is assumed to receive from the target a normalized steering vector (s). This signal is complex, MN dimensional and is defined according to:

$$s = [\underline{s}_1(\theta_t) \underline{s}_2(\theta_t) \ldots \underline{s}_M(\theta_t)]^T / \sqrt{NM} \quad (9)$$

$$\underline{s}_k(\theta_t) = e^{j 2 \pi (k-1) \bar{f}_D^t} \underline{s}_1(\theta_t) \text{ for } k = 1, \ldots, M \quad (10)$$

$$\underline{s}_1(\theta_t) = [s_{1,1}(\theta_t) s_{2,1}(\theta_t) \ldots s_{N,1}(\theta_t)] \quad (11)$$

$$s_{k,1}(\theta_t) = e^{j 2 \pi (k-1) \bar{\theta}_t} \text{ for } k = 1, \ldots, N \quad (12)$$

$$\bar{f}_D^t = f_D^t / f_r \quad (13)$$

$$f_D^t = 2v/\lambda = 2(v/c) f_c \quad (14)$$

$$f_r = 1/T_r \quad (15)$$

$$\theta_t = (d/\lambda) \sin(\theta_t) \quad (16)$$

where: 1) $\theta_t$ is the value of the boresight angle ($\theta$) where the target resides, $\theta_t = 0°$ for the case displayed in FIG. 2; 2) $f_c$ is the carrier (or operating) frequency of the radar system; 3) d is the antenna inter-element spacing; 4) $\lambda$ is the operating wavelength; 5) $\bar{\theta}_t$ is the normalized $\theta_t$; 6) $T_r$ is the pulse repetition interval (PRI); 7) $f_r$ is the pulse repetition frequency (PRF); 8) v is the target radial velocity; 9) c is the speed of light; 10) $f_D^t$ is the target Doppler; and 11) $\bar{f}_D^t$ is the normalized Doppler. Next the antenna pattern associated with the N antenna elements is described.

F. The Antenna Pattern

The MTI is characterized by a uniform linear array (ULA) that yields the following analytical and normalized gain expression for an antenna pattern with NM degrees of freedom:

$$g_i^{\theta_t} = K^f \left| \frac{\sin\left\{N \pi \frac{d}{\lambda} (\sin(\theta^i) - \sin(\theta_t))\right\}}{\sin\left\{\pi \frac{d}{\lambda} (\sin(\theta^i) - \sin(\theta_t))\right\}} \right|^2 / NM, i =, \ldots, NM \quad (17)$$

where: 1) $\theta$ denotes the boresight angle; 2) $\theta^i$ is the value of the boresight angle corresponding to the $i^{th}$ range-bin cell; 3) $\theta_t$ is the value of the boresight angle where the target of interest resides; 4) N is the number of antenna elements; 5) M is the number of pulses transmitted during the coherent pulse interval; 5) NM is the number of range-bin cells which is the same as the number of degrees of freedom; 6) d is the antenna inter-element spacing; 7) $\lambda$ is the operating wavelength; and 8) $K^f$ is the front antenna gain constant. Next the mathematical expression for the front clutter covariance matrix that the adaptive radar must evaluate on-line is described.

G. The Front Clutter Covariance Matrix:

The front clutter covariance matrix ($C_c^f(\theta_{AAM})$) is modeled according to:

$$C_c^f(\theta_{AAM}) = \sum_{i=1}^{NM} x_i g_i^{\theta_t} c_i(\theta_{AAM}) c_i^H(\theta_{AAM}) \quad (18)$$

where:
1) $\{x_i: i=1, \ldots, NM\}$ are the clutter powers of the front range-bin where $x_i$ denotes the $i^{th}$ cell clutter power.

2) $\{g_i^{\theta_t}: i=1, \ldots, NM\}$ are the NM gains of the antenna pattern (17) that points towards the target boresight angle $\theta_t$.

3) $\{x_i g_i^{\theta_t}: i=1, \ldots, NM\}$ denotes the NM antenna gain modulated clutter powers of the front range-bin.

4) $\{c_i(\theta_{AAM}): i=1, \ldots, NM\}$ denotes the NM steering vectors of the front range-bin cells whose values depend on the antenna array misalignment angle $\theta_{AAM}$. In particular, $c_i(\theta_{AAM})$ denotes the $i^{th}$ cell steering vector, which is complex and MN dimensional, defined according to:

$$c_i(\theta_{AAM}) = [f_{C_1}(\theta^i, \theta_{AAM}) \ldots f_{C_M}(\theta^i, \theta_{AAM}) \ldots f_{C_M}(\theta^i, \theta_{AAM})]^T \quad (19)$$

$$f_{C_k}(\theta^i, \theta_{AAM}) = e^{j2\pi(k-1)\bar{f}_D^{c_f}(\theta^i, \theta_{AAM})} \underline{c}_1(\theta^i) \text{ for } k=1, \ldots, M \quad (20)$$

$$\underline{c}_1(\theta^i) = [c_{1,1}(\theta^i) c_{2,1}(\theta^i) \ldots c_{N,1}(\theta^i)] \quad (21)$$

$$c_{k,1}(\theta^i) = e^{j2\pi(k-1)\bar{\theta}^i} \text{ for } k=1, \ldots, N \quad (22)$$

$$\bar{f}_D^{cf}(\theta^i, \theta_{AAM}) = \beta \bar{\theta}^i \quad (23)$$

$$\beta = (v_p T_r)/(d/2) \quad (24)$$

$$\bar{\theta}^i = (d/\lambda) \sin(\theta^i + \theta_{AAM}) \quad (25)$$

where 1) $v_p$ is the radar platform speed; 2) $\bar{\theta}^i$ is the normalized $\theta^i$, inclusive of the antenna array misalignment angle $\theta_{AAM}$ as seen from (25); and 3) $\beta$ is the ratio of the distance traversed by the radar platform during the PRI, i.e., $v_p T_r$, to the half antenna inter-element spacing, $d/2$. The remaining parameters for expressions (19)-(25) were earlier defined for (9)-(16). Finally, it is noted that the first element of $C_c^f(\theta_{AAM})$ divided by the variance of the thermal white noise $\sigma_n^2$ defines the front clutter to noise ratio (CNR$^f$), i.e., $$CNR^f = C_c^f(1,1)/\sigma_n^2 \quad (26)$$

5) $\{c_i(\theta_{AAM}) c_i^H(\theta_{AAM}): i=1, \ldots, NM\}$ denotes the set of cell steering matrices.

III. Power Centroid Radar

In one embodiment, the primary goal of a PC-Radar scheme is the adaptive evaluation of the front clutter covariance matrix $C_c^f(\theta_{AAM})$ (18) for later use in determining the interference plus noise covariance R expression (7)-(8), where it is also assumed that the remaining covariances in the expressions can be independently found. In descending order of storage-space/computational-time complexity there are four PC-Radar schemes. Two are KA and two are KU. Each is described next:

A. Knowledge Aided PC-Radar:

In KA PC-Radar the front clutter covariance matrix ($C_c^f(\theta_{AAM})$) of (18) is replaced by a KA version ($^{KA}C_c^f(\theta_{AAM})$) defined according to:

$$^{KA}C_c^f(\theta_{AAM}) = \eta \sum_{i=1}^{NM} g_i^{\theta_t = \theta^{PC_{KA}}} c_i(\theta_{AAM}) c_i^H(\theta_{AAM}) \quad (27)$$

$$1 \leq PC_{KA} = \sum_{i=1}^{NM} i \bar{x}_i g_i^{\theta_t = \theta^i} / P \leq NM \quad (28)$$

and $$P = \sum_{i=1}^{NM} \bar{x}_i g_i^{\theta_t = 0^\circ} \quad (29)$$

where: 1) $\{\bar{x}_i: i=1, \ldots, NM\}$ are the clutter powers of the range-bin extracted from SAR imagery; 2) $\{g_1^{\theta_t=0^\circ}, \ldots, g_{NM}^{\theta_t=0^\circ}\}$ denotes the physical antenna pattern or PAP directed towards the target at the zero boresight angle; 3) P denotes the received total clutter power; 4) $PC_{KA}$ denotes the KA power centroid of the range-bin; 5)

$$\{g_1^{\theta_t=\theta^{PC_{KA}}}, \ldots, g_{NM}^{\theta_t=\theta^{PC_{KA}}}\}$$

denotes the mathematical antenna pattern or MAP derived from (17) when it is directed towards the boresight angle $\theta^{PC_{KA}}$ corresponding to the range-bin location of $PC_{KA}$ rather than the boresight angle of 0° where the target is being investigated in our running example. In the disturbance control (or cybernetics) solution to the clutter covariance modeling of (27), the MAP acts as a "compensating vector gain" for the non-stationary clutter that disturbs the "stationary clutter" associated with (18), which yields an optimum result when both the location of the target and the PC are the same; 6) $\{c_i(\theta_{AAM}) c_i^H(\theta_{AAM}): i=1, \ldots, NM\}$ denotes the set of cell steering matrices for the range-bin; and 7) $\eta$ is a normalizing clutter power constant.

Figure 3:
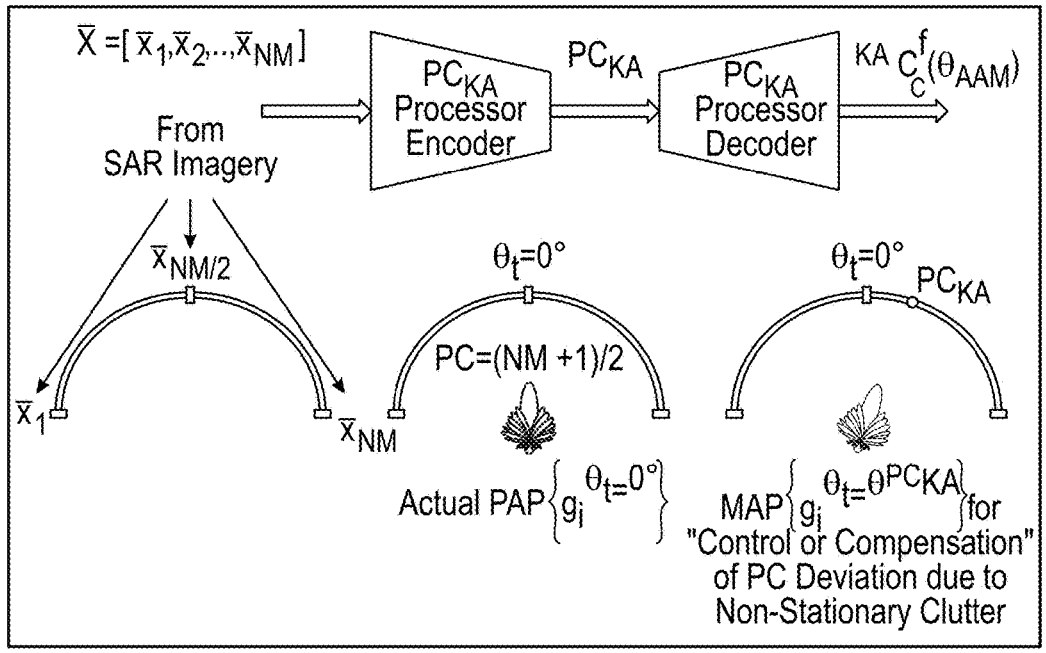
FIG. 3 a block-diagram of a decoder with a processor-encoder that derives $PC_{KA}$ from range-bin measurements extracted from SAR imagery and a second processor-decoder that receives $PC_{KA}$ and appropriately derived values for $\eta$ and $\theta_{AAM}$ to yield $^{KA}C_c^f(\theta_{AAM})$.

In FIG. 3 a block-diagram description for the computations of (27)-(29) is shown. The block-diagram is noted to have two major components. One is a processor-encoder that derives $PC_{KA}$ from range-bin measurements which are extracted from SAR imagery. The second major component is a processor-decoder that receives $PC_{KA}$ and appropriately derived values for $\eta$ and $\theta_{AAM}$ to yield $^{KA}C_c^f(\theta_{AAM})$. As seen from the top of FIG. 1 this processor encoder/decoder structure is the computational-time compression dual of the source encoder/decoder structure for storage-space compression, and thus transparently displays its UC-Duality roots. From (27) it is apparent that its on-line computational-time burden is significant due to the high dimensionality of all the needed operations. However, this problem can be greatly alleviated if one restricts the possible values that $PC_{KA}$ as well as $\theta_{AAM}$ may have, thus naturally leading us to exceedingly fast memory fetches based implementations. This approach gives rise to the second type of KA PC-Radar with power centroid or PC quantizations, called here QKA PC-Radar, that is described next.

B. Knowledge Aided PC-Radar with $PC_{KA}$ Quantization

In QKA PC-Radar the front clutter covariance matrix $^{KA}C_c^f(\theta_{AAM})$ of (27) is replaced by its PC quantized version ($^{QKA}C_c^f(\theta_{AAM})$) defined according to:

$$^{QKA}C_c^f(\theta_{AAM}) = \eta \sum_{i=1}^{NM} g_i^{\theta_t=\theta^{Q[PC_{KA}]}} c_i(\theta_{AAM}) c_i^H(\theta_{AAM}) \quad (30)$$

where expressions (27) and (30) are the same except that $PC_{KA}$ in (27) is replaced with $Q[PC_{KA}]$ to yield (30). The quantizer leading to $Q[PC_{KA}]$ can be defined, for instance, as follows:

$$1 \leq Q[PC_{KA}] = \min_i |PC_{KA} - i| \leq NM, \quad (31)$$

$$i \in \left\{1 + \frac{NM-1}{L+1}, 1 + 2\frac{NM-1}{L+1}, \ldots, 1 + L\frac{NM-1}{L+1}\right\}$$

where the value of L denotes the number of quantization levels. The quantization levels for $PC_{KA}$ are uniformly distributed over the range-bin according to (31).

Figure 4:
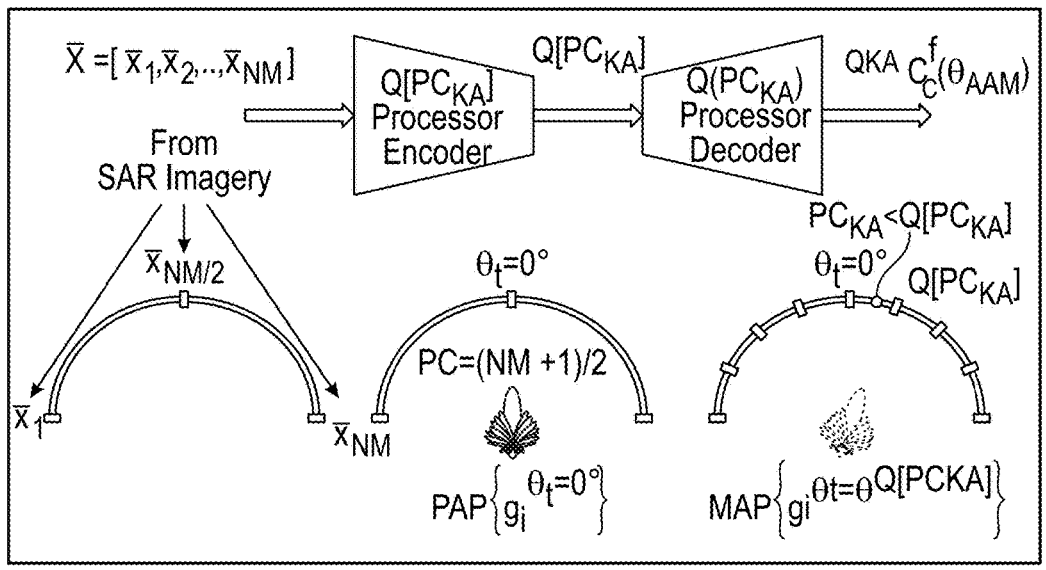
FIG. 4 a block-diagram description for the on-line computational structure that determines $PC_{KA}$ then follows it by the PC quantization yielding as output $Q[PC_{KA}]$.

In FIG. 4 a block-diagram description for the online computational structure that determines (30) is given. The processor encoder for this case performs the evaluation of $PC_1$ according to (28) and then follows it by the PC quantization according to (31) thus yielding as output $Q[PC_{KA}]$. On the other hand, the processor decoder is a fast lookup memory that stores off-line derived evaluations of (30) corresponding to allowed quantization levels for $PC_{KA}$ and known values for $\eta$ and $\theta_{AAM}$. It is also assumed here that appropriate quantizations of $\eta$ and $\theta_{AAM}$ are available for off-line evaluations of $^{QKA}C_c^f(\theta_{AAM})$. In this way the processor decoder selects from its memory the $^{QKA}C_c^f(\theta_{AAM})$ case that is matched to the received $Q[PC_{KA}]$ as well as on-line determined quantizations of $\eta$ and $\theta_{AAM}$. Moreover, it is noted that storage-space savings can be achieved by increasing the computational-time burden. For instance, this occurs when quantization versions of $^{QKA}C_c^f(\theta_{AAM})/\eta$ rather than of $^{QKA}C_c^f(\theta_{AAM})$ are saved, with the best case of $^{QKA}C_c^f(\theta_{AAM})/\eta$ first fetched from the memory and then multiplied by the on-line evaluated $\eta$. At this point prior-knowledge, i.e., the SAR imagery is used. It was noted earlier that using a radar-blind storage-space compression approach one can drastically compress the SAR images while still yielding outstanding SINR radar performance. The reason why this is possible is that the power centroid extracted from a SAR image range-bin is not significantly changed when the image is highly compressed as is shown in FIG. 8A to 8E. This realization then led to the hypothesis that the power centroid can be extracted directly from the on-line determined sample covariance matrix ($R_{SCM}$) defined according to:

$$R_{SCM} = \frac{1}{n}\sum_{i=1}^{n} Z_i Z_i^H \quad (32)$$

where the set $\{Z_i = [z_{i,1}, z_{i,2}, \ldots, z_{i,NM}]: i=1, \ldots, n\}$ denotes n measured samples, each complex and NM dimensional, from the range-bin in question and its immediate surroundings. Thus if the power centroid could be found directly from (32) PC-Radar will not require the use of SAR imagery, which is without doubt a major implementation advantage. Such a knowledge-unaided or KU PC-Radar scheme is described next.

Figures 5, 6:
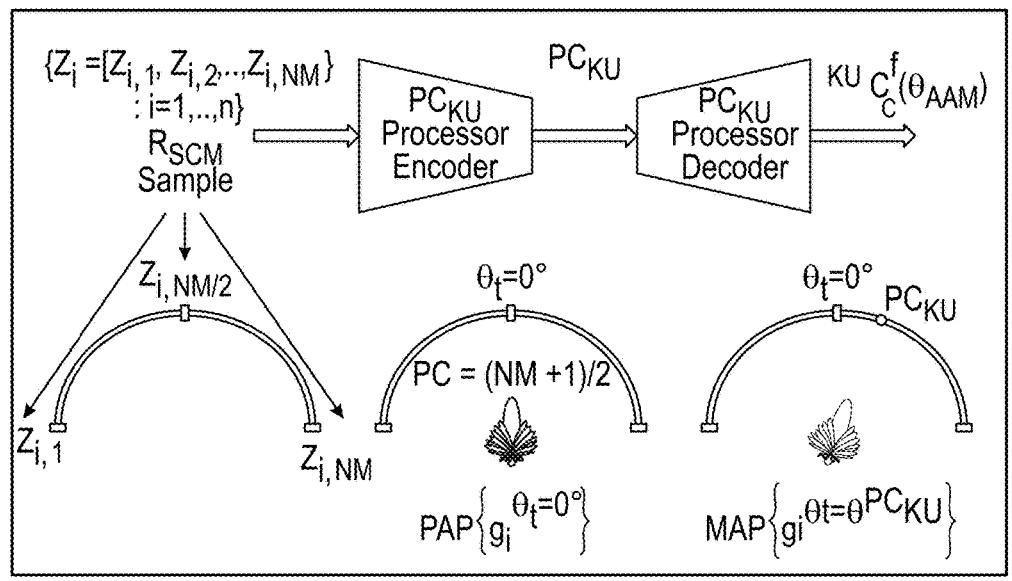
FIG. 5 Illustration of $R_{SCM}$ Moments for $PC_{KU}$ Evaluation when N=M=3.
FIG. 6 a block-diagram showing the $^{KU}C_c^f(\theta_{AAM})$ derivation.

C. Knowledge Unaided PC-Radar:

In KU PC-Radar the KA front clutter covariance matrix ($^{KA}C_c^f(\theta_{AAM})$) of (27) is replaced by a KU version ($^{KU}C_c^f(\theta_{AAM})$) defined according to:

$$^{KU}C_c^f(\theta_{AAM}) = \eta \sum_{i=1}^{NM} g_i^{\theta_t = \theta^{PCKU}} c_i(\theta_{AAM}) c_i^H(\theta_{AAM}) \quad (33)$$

where expressions (27) and (33) are the same except that $PC_{KA}$ is replaced with its knowledge-unaided power centroid version ($PC_{KU}$) that is defined in FIG. 5.

$$1 \leq PC_{KU} = \frac{\sum_{i=1}^{NM} ix_i g_i^{\theta_t=0°}}{\sum_{i=1}^{NM} x_i g_i^{\theta_t=0°}} = \frac{NM+1}{2} + \Delta PC(R_{SCM}) \leq NM \quad (34)$$

$$-\frac{NM-1}{2} \leq \Delta PC(R_{SCM}) = \frac{\sum_{i=2}^{N+M-1} k_i \text{Imag}[m_i]}{m_1} \leq \frac{NM-1}{2} \quad (35)$$

where:

1) $\{x_1, \ldots, x_{NM}\}$ denotes the set of clutter powers of the NM range-bin cells.
2) $(NM+1)/2$ in (34) denotes the value that $PC_{KU}$ achieves when the clutter is stationary.
3) $\Delta PC(R_{SCM})$ denotes a $R_{SCM}$ dependent non-stationary clutter correction to the power centroid of stationary clutter.
4) $\{m_1, m_2, \ldots, m_{N+M-1}\}$ denotes a set of N+M−1 first row elements of the complex NM×NM dimensional sample covariance matrix $R_{SCM}$. These N+M−1 elements are $2^{nd}$ order statistical moments that are selected following the "column pattern" described in FIG. 5 for the N=111=3 case.
5) $\text{Imag}[m_i]$ denotes the imaginary part of the $m_i$ moment.
6) $\{k_i; i=2, \ldots, N+M-1\}$ is a set of gains that weights the contribution of $\{\text{Imag}[m_i]; i=2, \ldots, N+M-1\}$ to the sum of imaginary moment values in (35) that results in $\Delta PC(R_{SCM})$.

In Appendix B expressions (34) and (35) are derived for the mathematically tractable case corresponding to M=2, N=2 and $\beta=1$. In particular, in (B.17) the values for $k_2$ and $k_3$ are given. Later in Section IV where radar simulation results are presented for the M=16, N=16 and $\beta=1$ case, the following simple expression will be used in determining the set of gains $\{k_i; i=2, \ldots, N+M-1\}$:

$$k_i = -60(-1)^i \frac{1}{2^{i-2}}, \quad (36)$$

$$i = 2, \ldots, N+M-1$$

In FIG. 6 a block-diagram description for the $^{KU}C_c^f(\theta_{AAM})$ derivation of (33) is shown. The block-diagram is noted to have two major components. One is a processor-encoder that derives $PC_{KU}$ according to (34)-(36). The second one is a processor-decoder that receives $PC_{KU}$ and appropriately derives values for $\eta$ and $\theta_{AAM}$ to yield $^{KU}C_c^f(\theta_{AAM})$.

From expression (33) it is once again apparent that the required on-line computations are quite taxing due to the high dimensionality of the complex multiplications. However, as noted earlier for the KA case this problem is greatly alleviated if one restricts the possible values that $PC_{KU}$ as well as $\theta_{AAM}$ may have. This is what is done in the KU PC-Radar with $PC_{KU}$ quantization scheme, called here QKU PC-Radar, that is described next.

D. Knowledge Unaided PC-Radar with $PC_{KU}$ Quantization

In QKU PC-Radar the front clutter covariance matrix $^{KU}C_c^f(\theta_{AAM})$ of (33) is replaced by its PC quantized version ($^{QKU}C_c^f(\theta_{AAM})$) defined according to:

$$^{QKU}C_c^f(\theta_{AAM}) = \eta \sum_{i=1}^{NM} g_i^{\theta_t = \theta Q[PC_{KU}]} c_i(\theta_{AAM}) c_i^H(\theta_{AAM}) \qquad (37)$$

where expressions (33) and (37) are the same except that $PC_{KU}$ in (33) is replaced with $Q[PC_{KU}]$ to yield (37). The quantizer leading to $Q[PC_{KU}]$ can be defined, for instance, as follows:

$$1 \le Q[PC_{KU}] = \min_i |PC_{KU} - i| \le NM, \qquad (38)$$

$$i \in \left\{ 1 + \frac{NM-1}{L+1}, 1 + 2\frac{NM-1}{L+1}, \ldots, 1 + L\frac{NM-1}{L+1} \right\}$$

where the value of L denotes the selected number of quantization levels. These quantization levels for $PC_{KU}$ are uniformly distributed over the range-bin in this particular example.

Figure 7:
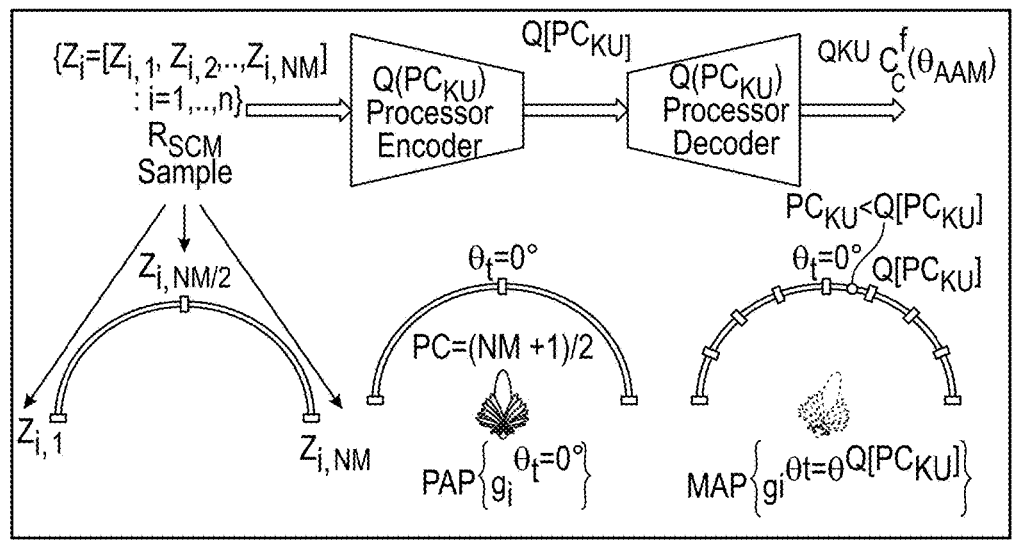
FIG. 7 is a block-diagram description for the computation of $^{QKU}C_c^f(\theta_{AAM})$.

In FIG. 7 a block-diagram description for the computation of $^{QKU}C_c^f(\theta_{AAM})$ according to (37) is shown. The block-diagram is noted to have two major components. One is a processor-encoder that derives $Q[PC_{KU}]$ according to (38), after first finding $PC_{KU}$ according to (34)-(36) as described earlier. On the other hand, the processor decoder is a fast lookup memory that stores off-line derived expressions for (37) corresponding to allowed quantization levels for $PC_{KU}$, $\eta$ and $\theta_{AAM}$. Alternative options available are similar to those described when the required PC quantizations for the KA case $^{QKA}C_c^f(\theta_{AAM})$ were considered. In the next section simulations results using real world SAR-imagery are provided.

IV. Illustration of PC-Radar SINR Performance

In this section, under severely taxing environmental conditions, the SINR performance of both KA and KU PC-Radar are found to approach that of an idealized DARPA KASSPER scheme, referred in our simulations as Optimum-Radar. In Optimum-Radar one uses the covariance matrix tapers approach to interference plus noise covariance (R) modeling of (7)-(8) to derive the optimum radar gain that emerges from the Wiener-Hopf equation

TABLE I

| | Radar Simulation Values |
|---|---|
| 1. Antenna | Number of antenna elements: N = 16 |
| | Number of CPI pulses: M = 16 |
| | Ratio of antennal inter element spacing to wavelength: d/λ = ½ |
| | Variance of thermal white noise (26): $\sigma_n^2 = 1$ |
| | Front antenna gain constant (17): $K^f$ = 56 dBs |
| | Back antenna gain constant: $K^b$ = −40 dBs |
| | Carrier frequency (14): $f_c = 10^9$ Hz |
| | Pulse repetition frequency (15): $f_r = 10^3$ Hz |
| | Antenna array misalignment (25): $\theta_{AAM}$ = 2° |
| 2. Clutter | Number of Range-Bins NM = 256 |
| | Radar's ratio β (24): β = 1 |
| 3. Jammers | Jammers are used at the boresight angles of −60°, −30° and 45° with 52, 55 and 66 JNRs in dBs, respectively, inclusive of antenna gains. |

TABLE I-continued

| | Radar Simulation Values |
|---|---|
| 4. Range Walk | Fraction of remaining area after range walk (A.12): ρ = 0.999999. |
| 5. Internal Clutter Motion | Shape factor, (A.14): b = 5.7<br>Wind-speed, (A.16): ω = 15 mph |
| 6. Channel Mismatch: Finite-Bandwidth | Amplitude peak deviation, (A.20): Δε = 0.001,<br>Phase peak deviation, (A.20): Δφ = 0.1° |
| 7. Channel Mismatch: Angle-Dependent | Bandwidth, (A.24): B = $10^8$ Hz<br>Mainbeam width, (A.24): Δθ = 28.6° |
| 8. Channel Mismatch: Angle-Independent | Amplitude error (A.29): $\Delta\varepsilon_i$ = 0 for all i,<br>Phase-error (A.29): $\Delta\gamma_i$ fluctuates with a 5° rms for all i |

(5). Also in this section the PC-Radar schemes are found to exceed by more than 6 dBs, in average, the SINR performance of the classical KU sample covariance matrix approach, referred in our simulations as SCM-Radar.

In Table I the physical variable values that are assumed in the simulations to model major disturbance cases as well as the radar operating conditions are stated. With the exception of the front clutter covariance matrix $C_c^f(\theta_{AAM})$ (18), which is found either from the SAR imagery prior-knowledge or from simulated noisy range-bin measurements, the value of the interference covariances used in SINR evaluations is determined making use of the physical variables available from Table I. We next present simulation results in seven subsections labeled as A thru G.

A. Assumed SAR Imagery for Investigation

Figure 8A:
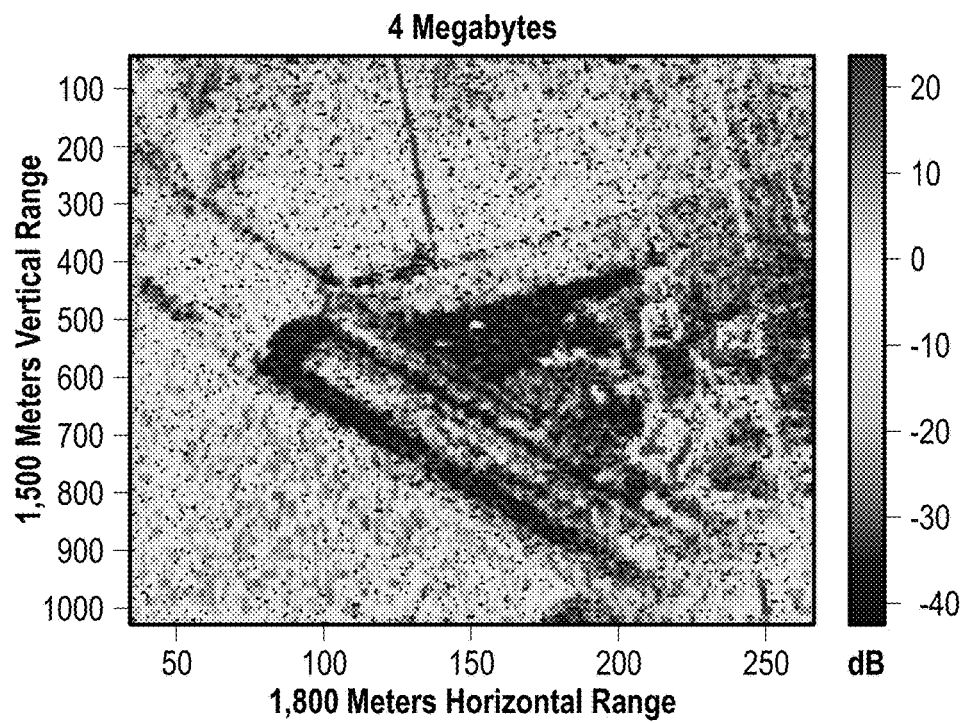
FIG. 8A is the SAR image of the Mojave Airport in California displayed in 4 megabyte.

The SAR image of the Mojave Airport in California displayed in FIG. 8A will be used. This 4 megabytes image comprises 1,024 by 256 pixel elements representing 1,800 by 1,500 meters of the airport, where each pixel denotes clutter power. Sixteen consecutive rows of FIG. 8A are averaged to form the 64×256 image of FIG. 8B, where each row denotes a range-bin with 256 clutter cells that will be used in our simulations. The 256 clutter cells are specified in the simulation Table I as NM=256 where N=M=16. One notices in FIG. 8C a compressed 512 bytes SAR image that surfaces when the 4 Mbytes SAR image of FIG. 8A is first compressed using a strip PT source-coder, and then sixteen consecutive rows of the result averaged. In FIG. 8D and FIG. 8E one then views the total clutter power and clutter power-centroid, respectively, corresponding to the 64 range-bins of the uncompressed SAR image of FIG. 8B. Although the power centroids displayed in FIG. 8E were derived from the uncompressed SAR image of FIG. 8B, the power centroids derived from the compressed SAR image of FIG. 8C are not much different. This remarkable result, corresponding to a compression factor of 7,812 for the compressed SAR image, inspired the development a "knowledge-unaided" scheme, i.e., one without the use of SAR imagery, where the power-centroid is derived directly from the KU sample covariance matrix (32).

B. Optimum SINR Performance (SINR*) of KA CMT-Based KASSPER Scheme

Figure 8B:
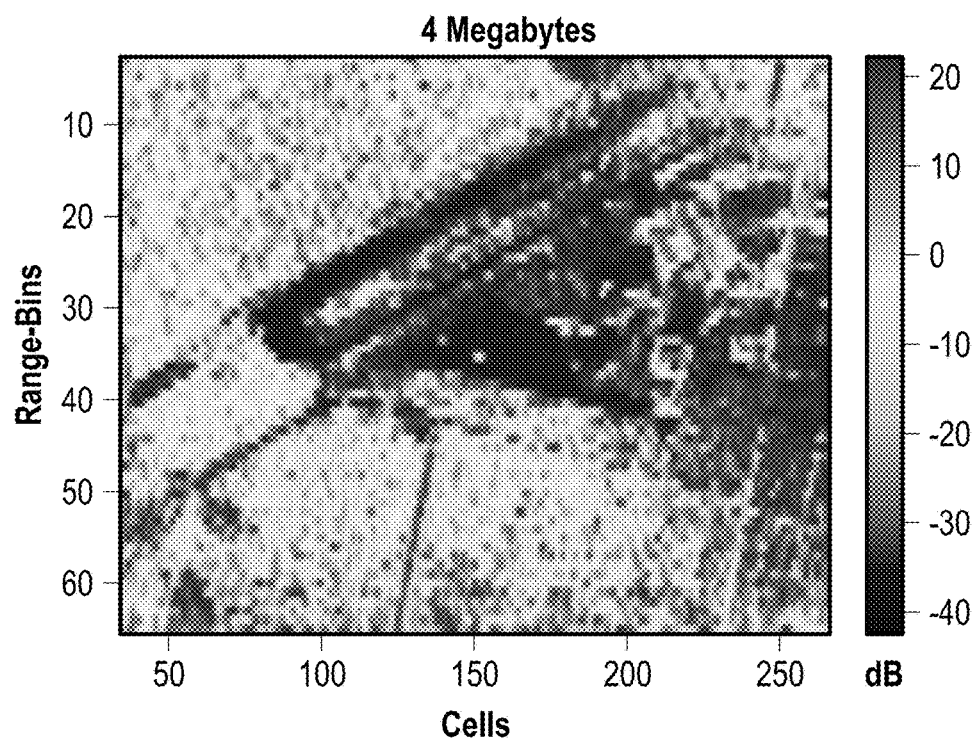
FIG. 8B, where each row denotes a range-bin with 256 clutter cells that will be used in our simulations.
Figure 8C:
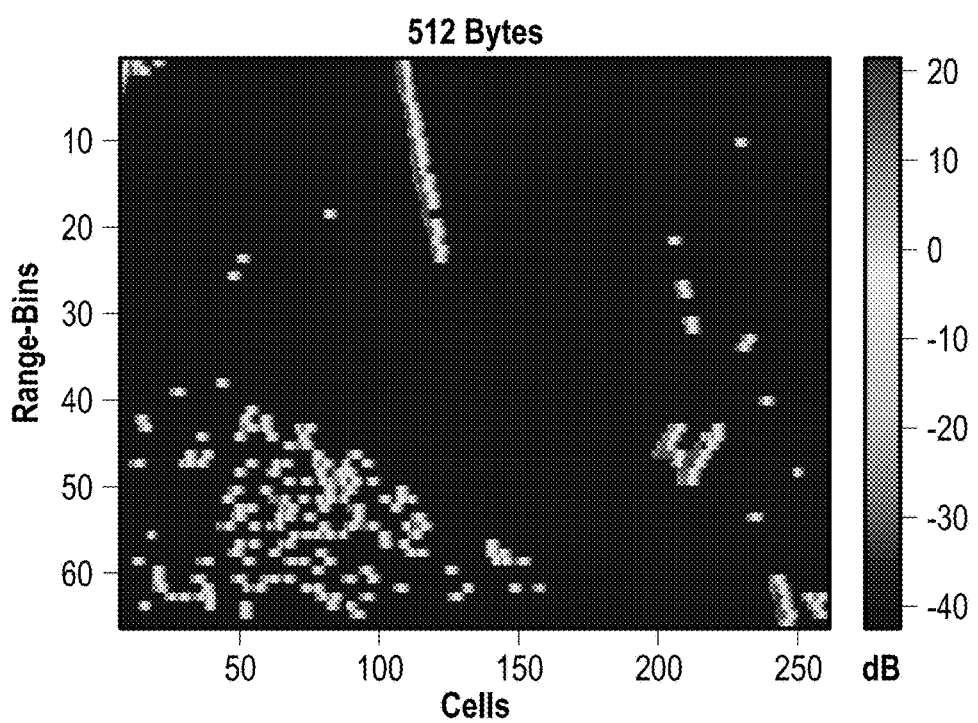
FIG. 8C a compressed 512 bytes.
Figure 8D:
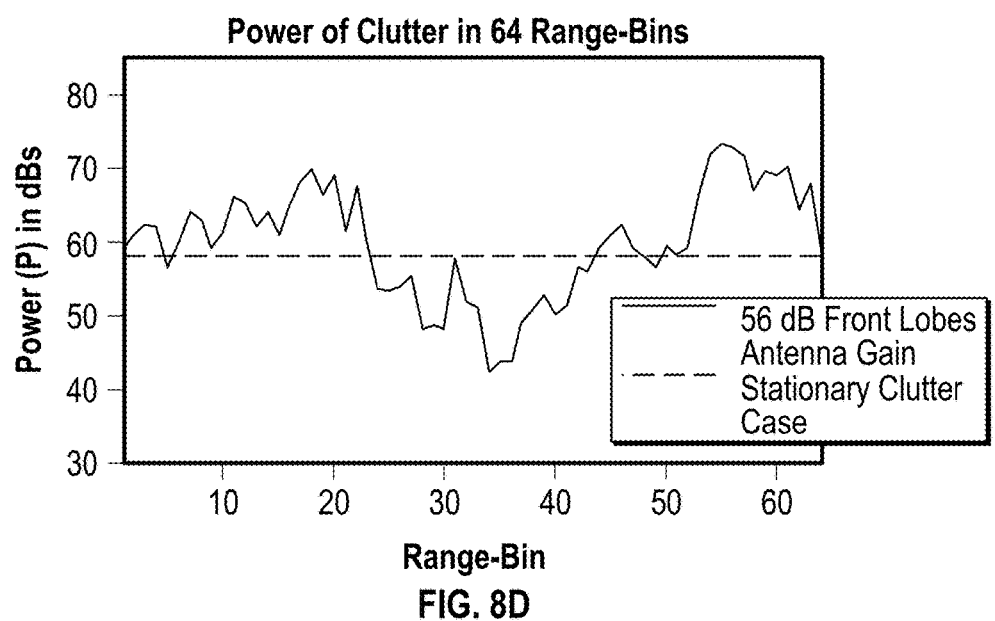
FIG. 8D and FIG. 8E show clutter and power centroid values.
Figure 8E:
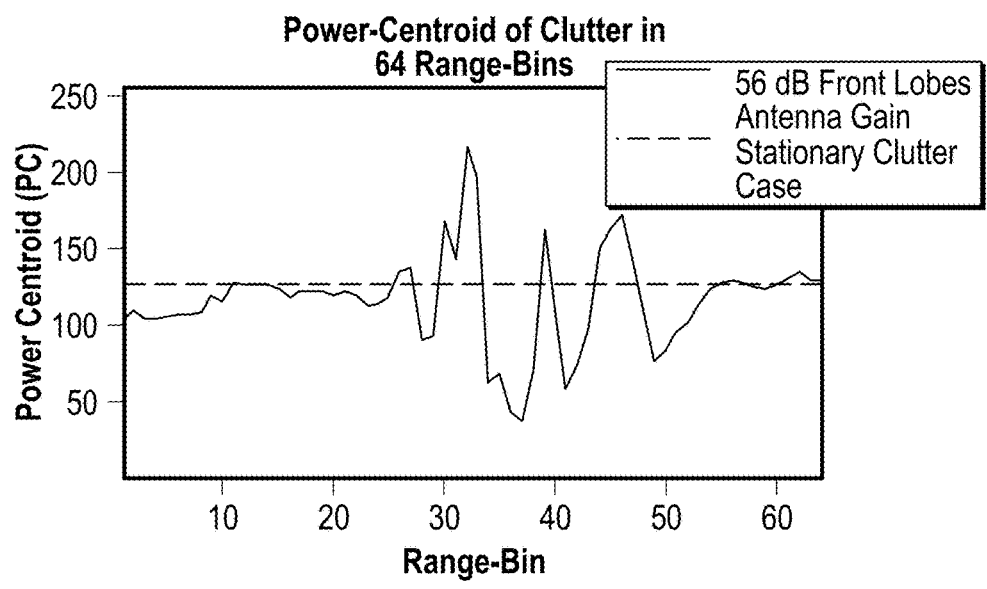

The optimum SINR* performance associated with a KA covariance matrix tapers based scheme is readily derived since it is assumed that the "true" clutter power of the range-bin in question is identical to that of the corresponding SAR image range-bin of FIG. 8B. In determining SINR* the physical variable values of Table I will be used to find all the prerequisite interference plus noise covariances in (7)-(8). In particular, when finding SINR* the back clutter covariance matrix $C_c^b(\theta_{AAM})$ will be assumed negligible since the assumed back-lobes antenna gain $K^b$ is quite small, i.e., −40 dB.

C. SINR Performance of KU Sample Covariance Matrix (SCM) Radar Scheme

The SINR performance of a KU SCM-Radar scheme ($SINR_{SCM}$) will also be derived. It is defined according to:

$$SINR_{SCM} = |w_{SCM}^H s|^2 / w_{SCM}^H R w_{SCM} \quad (39)$$

$$w_{SCM} = \hat{R}_{SCM}^{-1} s \quad (40)$$

$$\hat{R}_{SCM} = \frac{1}{n}\sum_{i=1}^{n} Z_i Z_i^H + \sigma_{Diag}^2 I \quad (41)$$

where: a) R is the interference plus noise covariance of (7); b) $\hat{R}_{SCM}$ is the sample covariance matrix; c) $\sigma_{diag}^2 I$ is a diagonal loading term that addresses numerical issues linked to the $\hat{R}_{SCM}$ inversion, a value of 10 for $\sigma_{diag}^2$ is used in our simulations; and d) $\{Z_i, i=1, \ldots, n\}$ denotes n samples taken from the investigated range-bin and its neighbors, each complex and NM dimensional.

To derive the set of range-bin measurements $\{Z_i, i=1, \ldots, n\}$ the following simulation technique is used $$Z_i = R_i^{1/2} n_i \quad (42)$$

where $n_i$ is a zero mean, unity variance, NM dimensional complex random draw and $R_i$ is the interference plus noise covariance (7) associated with the $i^{th}$ range-bin and derived as described earlier for the optimum SINR* performance scheme.

D. SINR Performance of KA PC-Radar Scheme

The SINR performance of the KA PC-Radar scheme ($SINR_{KA}$) will be investigated. It is defined according to:

$$SINR_{KA} = |w_{KA}^H s|^2 / w_{KA}^H R w_{KA} \quad (43)$$

$$w_{KA} = \hat{R}_{KA}^{-1} s \quad (44)$$

$$\hat{R}_{KA} = R|_{C_c^f(\theta_{AAM}) = {}^{KA}C_c^f(\theta_{AAM})} \quad (45)$$

where: a) R is the interference plus noise covariance of (7); b) ${}^{KA}C_c^f(\theta_{AAM})$ is the clutter covariance matrix (27) derived from KA PC-Radar; c) $\hat{R}_{KA}$ is the estimate of R that results when ${}^{KA}C_c^f(\theta_{AAM})$ replaces $C_c^f(\theta_{AAM})$ in (7): and d) $w_{KA}$ is the radar weighing gain of the KA PC-Radar system.

E. SINR Performance of KU PC-Radar Scheme

The SINR performance of the KU PC-Radar scheme ($SINR_{KU}$) may also be described and defined according to:

$$SINR_{KU} = |w_{KU}^H s|^2 / w_{KU}^H R w_{KU} \quad (46)$$

$$w_{KU} = \hat{R}_{KU}^{-1} s \quad (47)$$

$$\hat{R}_{KU} = R|_{C_c^f(\theta_{AAM}) = {}^{KU}C_c^f(\theta_{AAM})} \quad (48)$$

where: a) R is the interference plus noise covariance of (7); b) ${}^{KU}C_c^f(\theta_{AAM})$ is the clutter covariance matrix (33) derived from KU PC-Radar; c) $\hat{R}_{KU}$ is the estimate of R that results when ${}^{KU}C_c^f(\theta_{AAM})$ replaces $C_c^f(\theta_{AAM})$ in (7): and d) $w_{KU}$ is the radar weighing gain of the KU PC-Radar system.

F. SINR Performance of KU PC-Radar Scheme with PC Quantizations

The SINR performance of the KU PC-Radar scheme ($SINR_{QKU}$) with PC quantization, referred in the simulations as QKU PC-Radar, will also be studied. It is defined according to:

$$SINR_{QKU} = |w_{QKU}^H s|^2 / w_{QKU}^H R w_{QKU} \quad (49)$$

$$w_{QKU} = \hat{R}_{QKU}^{-1} s \quad (50)$$

$$\hat{R}_{QKU} = R|_{C_c^f(\theta_{AAM}) = {}^{QKU}C_c^f(\theta_{AAM})} \quad (51)$$

where: a) R is the interference plus noise covariance of (7); b) ${}^{QKU}C_c^f(\theta_{AAM})$ is the clutter covariance matrix (37) derived from QKU PC-Radar; c) $\hat{R}_{QKU}$ is the estimate of R that results when ${}^{QKU}C_c^f(\theta_{AAM})$ replaces $C_c^f(\theta_{AAM})$ in (7): and d) $w_{QKU}$ is the radar weighing gain of the QKU PC-Radar system.

G. Comparison of Various Schemes

The simulation results are summarized in FIG. 9A to FIG. 10G and FIG. 10A to FIG. 10G. The basic difference between the two results is in the number of quantization levels allowed for clutter centroid quantizations. FIGS. 8A to 8E corresponds to eleven quantization levels and FIG. 9A to 9G to only three quantization levels. In both cases the simulations are done with three jammers at the boresight angles of −60°, −30° and 45° with corresponding JNR values of 52, 55, and 66 dBs, respectively, as noted in Table I.

Figure 9A:
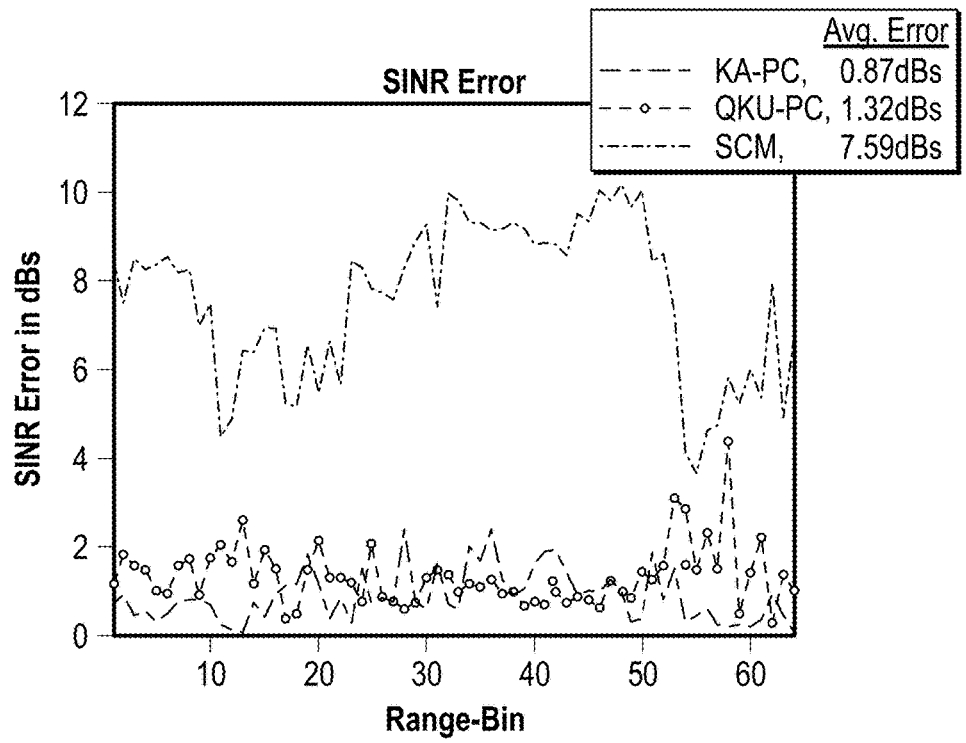
FIGS. 9A to 9G and FIG. 10A to 10G show the simulation results.
Figure 10A:
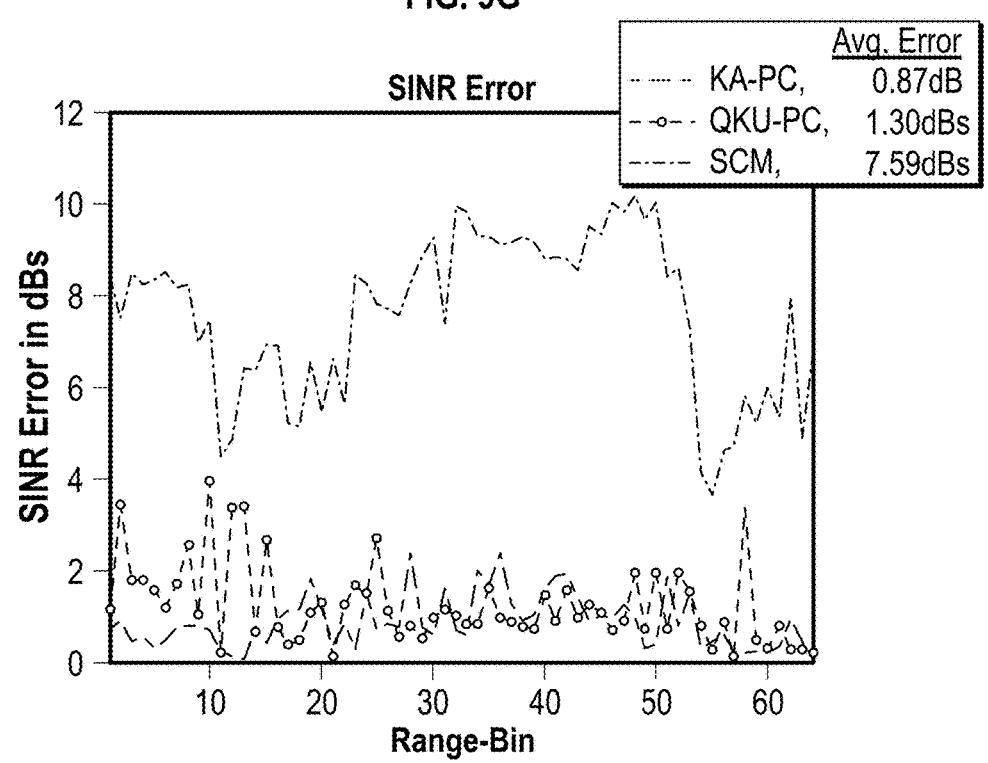

Each figure has seven displays. FIG. 10A and FIG. 9A show the SINR error in dBs as a function of range-bin where it is noted that the average SINR error over all range-bins for the SCM-Radar scheme of (39)-(42), the KA PC-Radar scheme of (43)-(45), and the QKU PC-Radar scheme of (49)-(51). For example, in FIG. 9A KA PC-Radar, QKU PC-Radar and KU SCM-Radar are noted to yield an average SINR error of 0.87 dBs, 1.32 dBs and 7.59 dBs, respectively. These results show that the KA and KU PC-Radar schemes yield more than 6 dBs improvements over SCM-Radar, while also yielding close to optimum SINR radar performance.

Figure 9B:
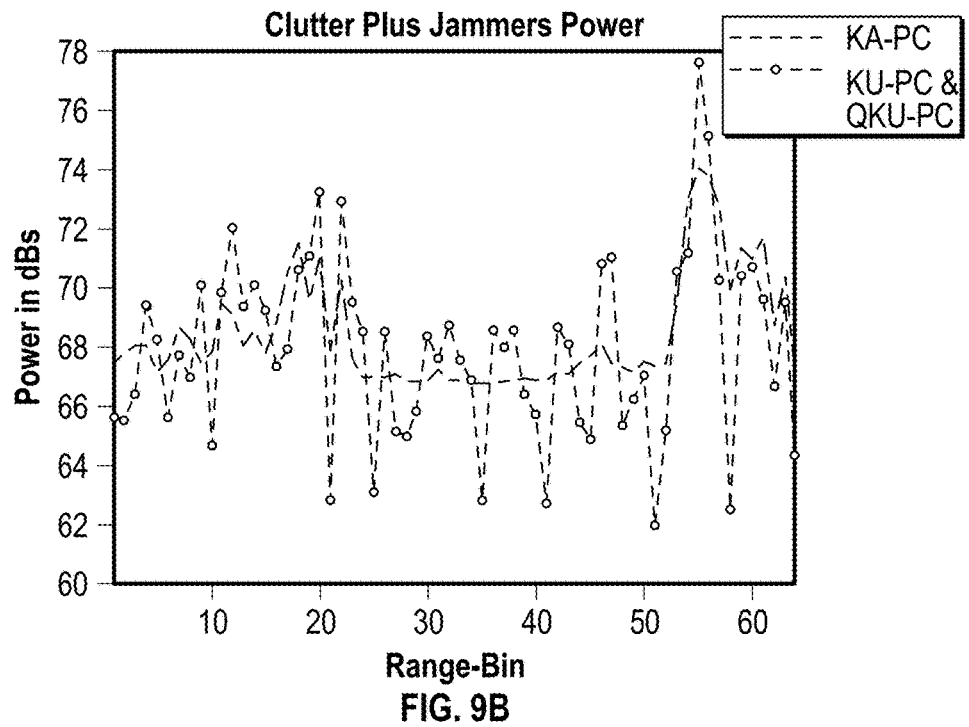
Figure 10B:
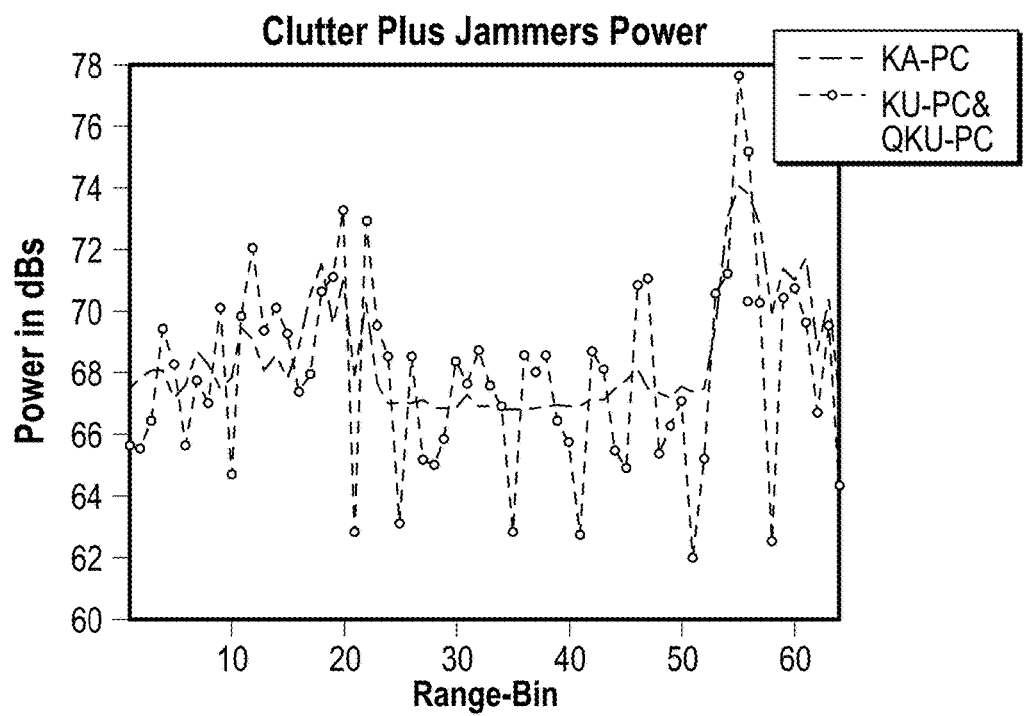

In FIG. 9B and FIG. 10B the total clutter plus jammer power of the KA PC-Radar, KU PC-Radar and QKU PC-Radar schemes is displayed. The two KU PC-Radar schemes are noted to yield the same total power for each range-bin. This total power, however, is also noted to deviate greatly from that of the KA PC-Radar scheme that uses in its evaluations the "true" SAR range-bin clutter plus jammer. This deviation from the true case is due to the fact that the total clutter plus jammer power derived with a KU PC-Power scheme is simply the first moment $m_1$ of the sample covariance matrix (32), whose value depends on noisy on-line measurements.

Figure 9C:
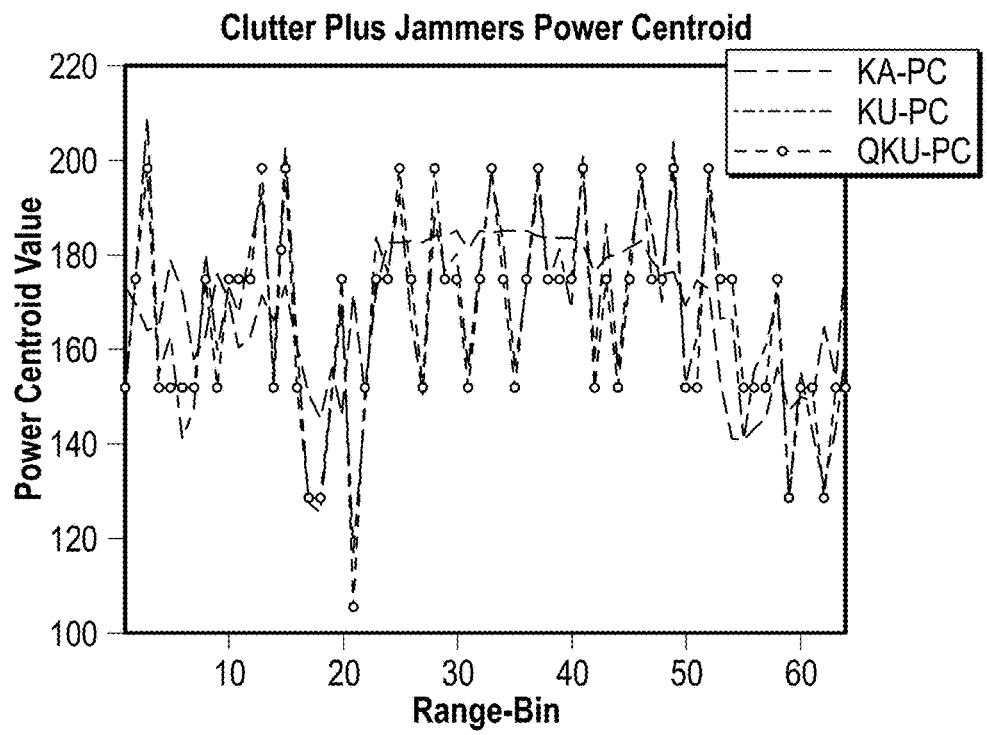
Figure 9D:
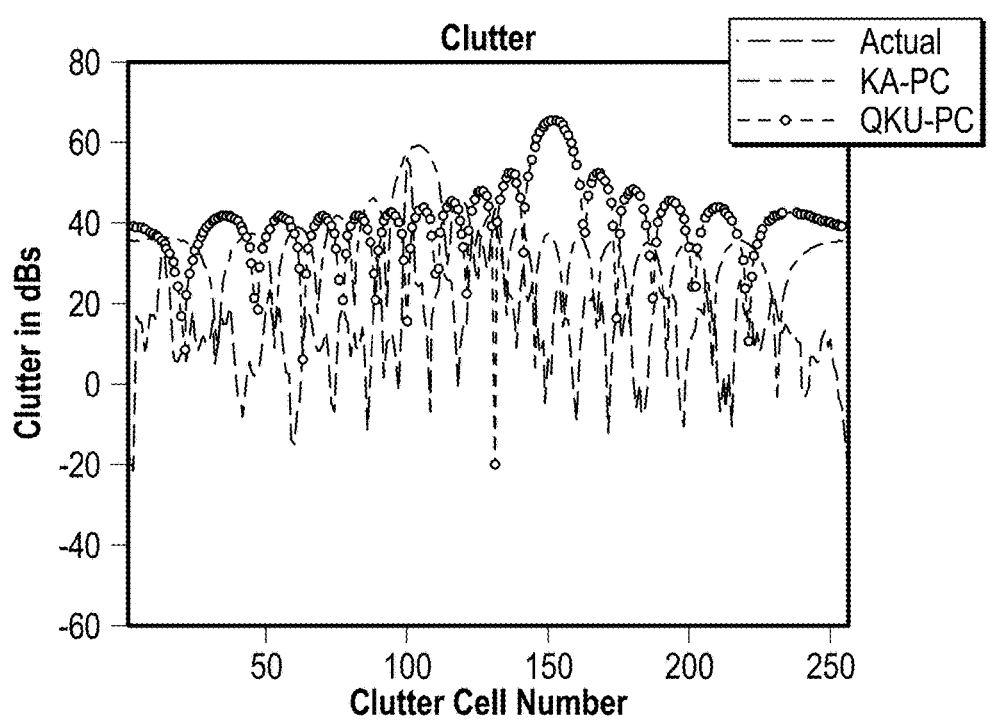
Figure 10C:
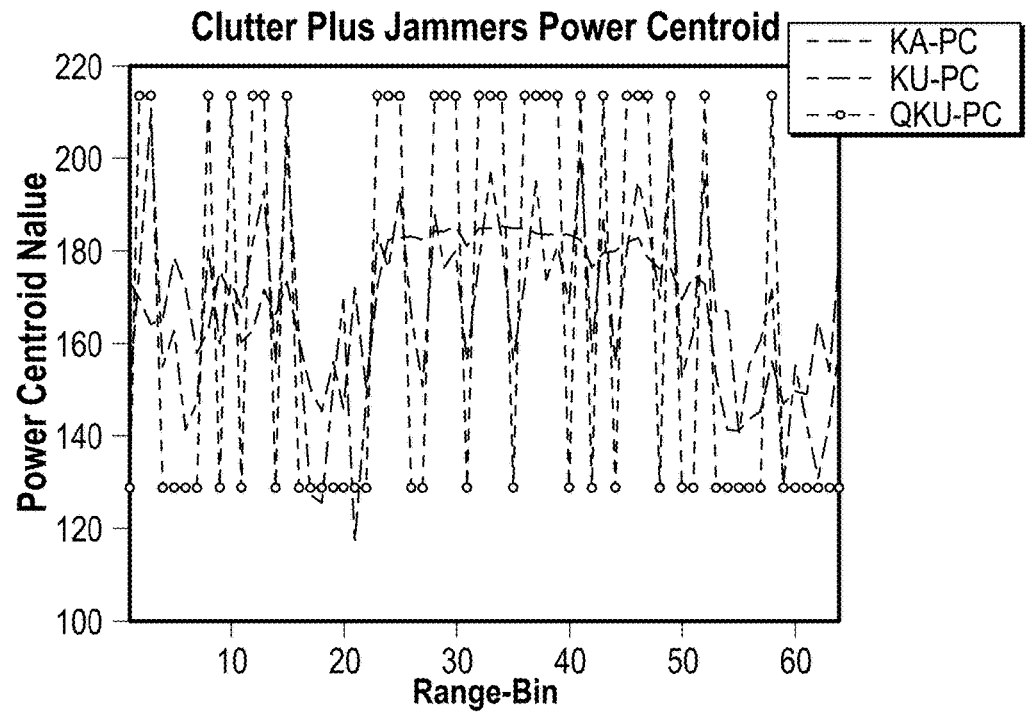
Figure 10D:
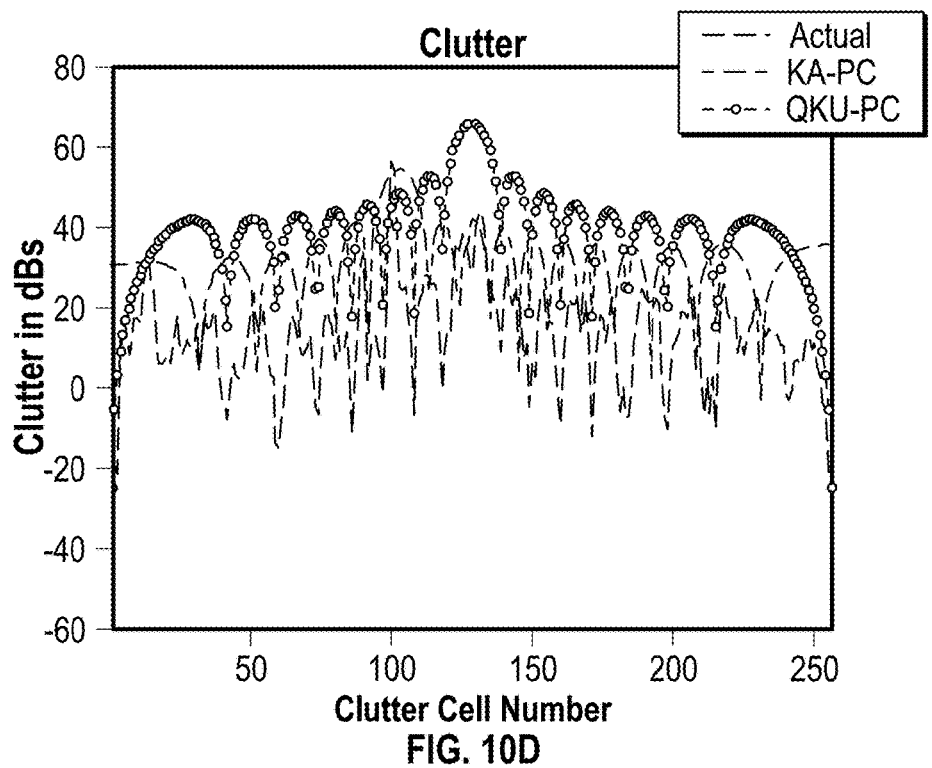
Figure 10E:
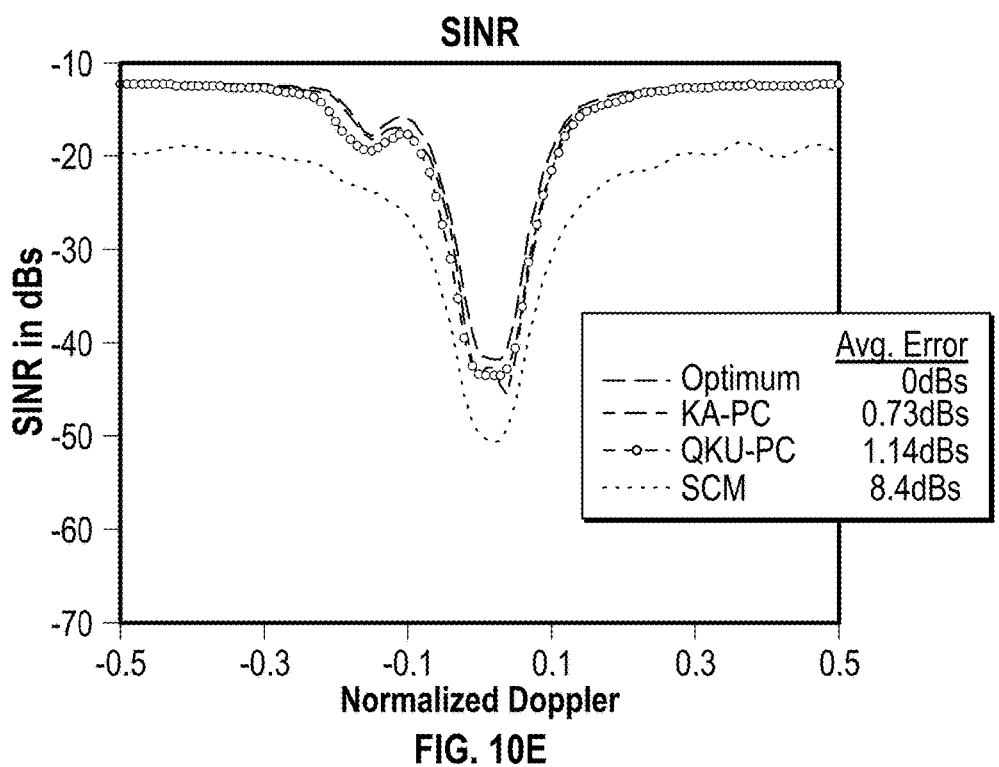

Next in FIG. 9C and FIG. 10C the range-bin power-centroid corresponding to KA PC-Radar, KU PC-Radar and QKU PC-Radar are displayed. From this figure it is noted that the two KU schemes yields close trajectories that roughly follow the KA PC-Radar power centroid which is once again noted to be derived from the "true" SAR rang-bin clutter plus jammer.

Finally FIGS. 9D and 9G and FIGS. 10D and 10G display results in dBs for the first range-bin of FIG. 8B. More specifically, in FIG. 9D and FIG. 10D the antenna gain modulated clutter is displayed for three cases. First from the actual SAR range-bin clutter covariance (18), i.e., $\{x_i g_i^{\theta_i}: i=1, \ldots, NM\}$, second from KA PC-Radar covariance (27), i.e., $$\{ng_i^{\theta_i = \theta^{PC_{KA}}} : i = 1, \ldots, NM\}$$

and thirdly from QKU PC-Radar (37), i.e., $$\{ng_i^{\theta_i = \theta^{Q\{PC_{KU}\}}} : i = 1, \ldots, NM\}.$$

Figure 9E:
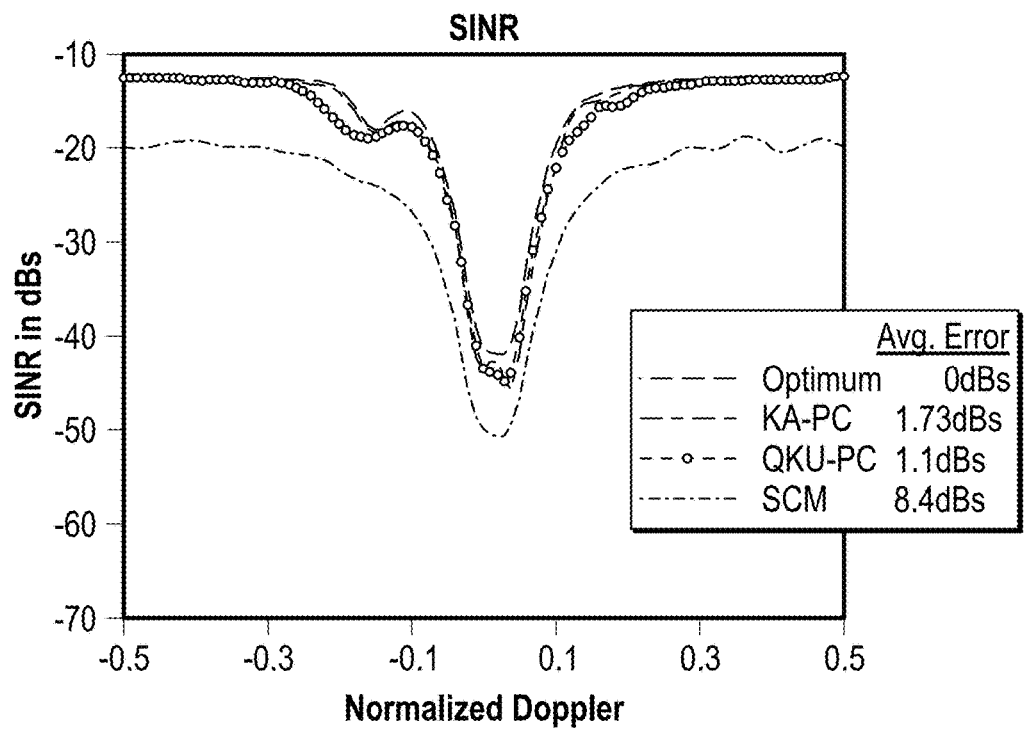
Figure 9F:
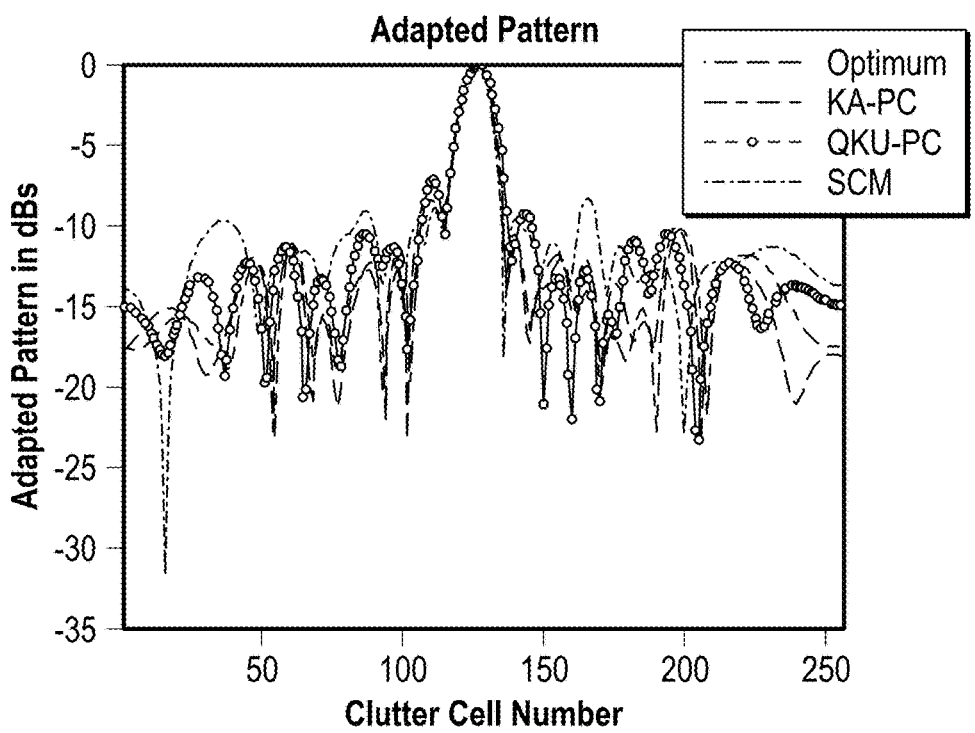
Figure 9G:
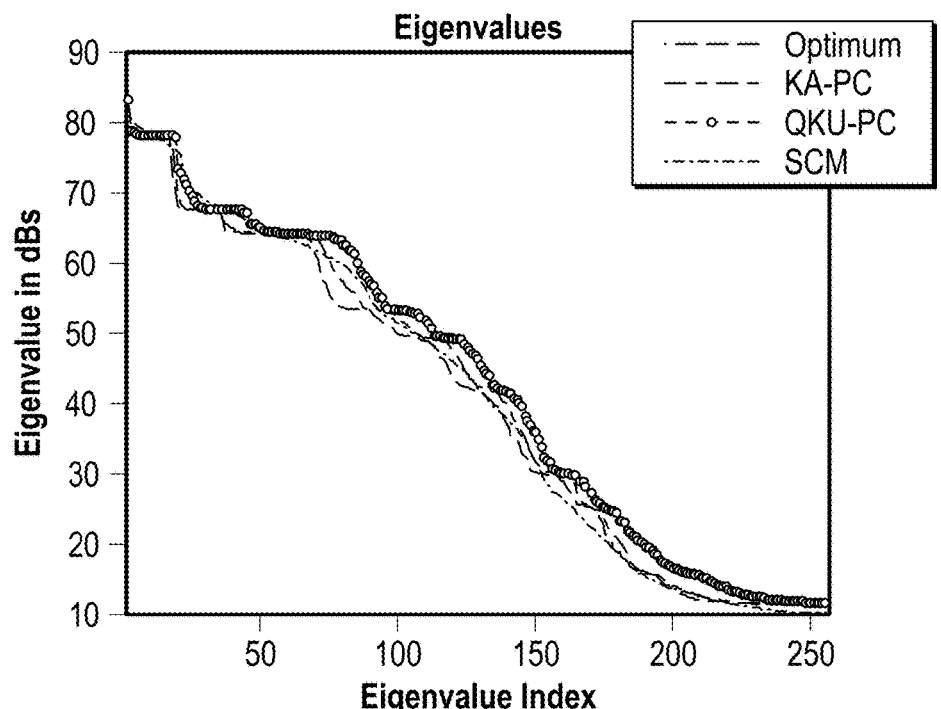
Figure 10F:
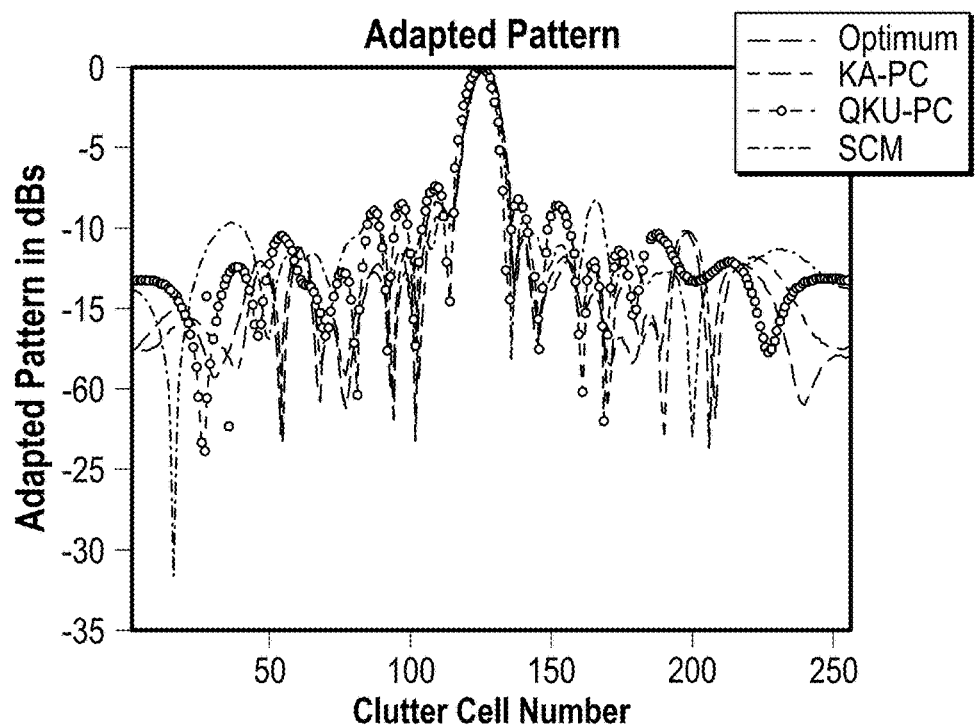
Figure 10G:
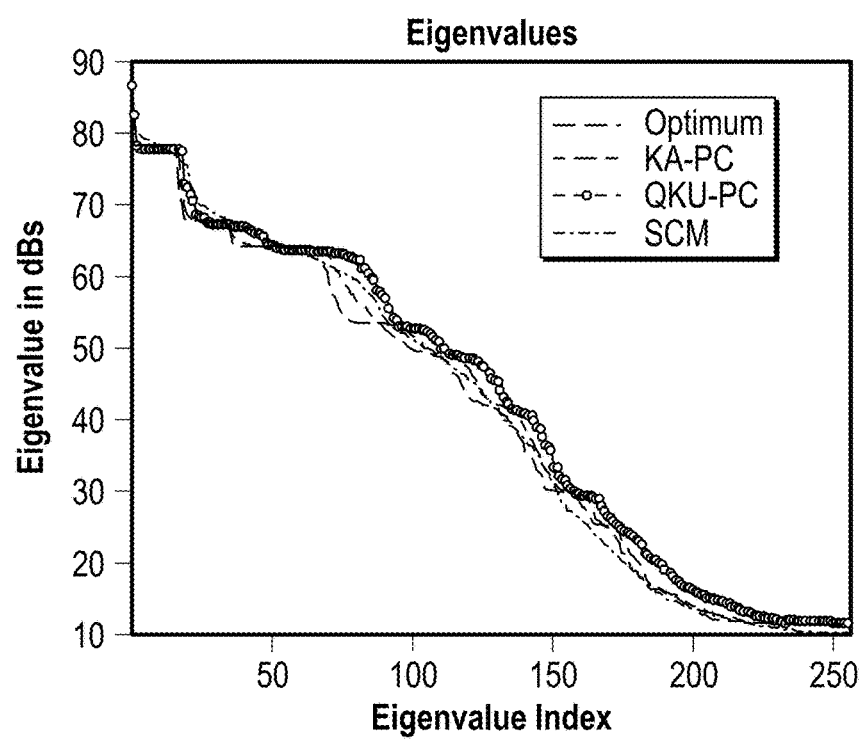

In FIGS. 8e and 9e the SINR is plotted versus Doppler for the Optimum-Radar, KA PC-Radar, QKU PC-Radar and SCM-Radar cases. In FIGS. 9f and 10f the adapted patterns are presented for the Optimum-Radar, KA PC-Radar, QKU PC-Radar and SCM-Radar cases. Finally, in FIG. 9G and FIG. 10G the eigenvalues of the interference plus noise covariance matrix versus eigenvalues index are plotted for the Optimum-Radar, KA PC-Radar, QKU PC-Radar and SCM-Radar cases.

The results presented in FIG. 8A to FIG. 8G and FIG. 9A to 9G are typical results for the compared schemes. The following conclusions are then drawn:

1. The SINR radar performance of both KA and KU PC-Radar emulates that of Optimum-Radar, which uses a covariance matrix tapers model for the interference plus noise covariance.
2. The SINR radar performance derived from both KA and KU PC-Radar represents a major improvement over KU SCM-Radar of more than 6 dBs for the considered illustration.
3. The KA PC-Radar scheme performs well with both uncompressed SAR imagery and "radar-blind compressed" SAR imagery because the range-bin power centroid derived from them do not vary greatly. This robustness observation led, in turn, to the discovery of "knowledge-unaided" PC-Radar.
4. The savings in on-line computational time of QKA PC-Radar over KA PC-Radar are significant because off-line computations of a small set of clutter covariance matrices permit their later fast extraction from a lookup memory.
5. The savings in storage space of KU PC-Radar over KA PC-Radar are significant because the storage of SAR imagery is unnecessary for power centroid evaluations.
6. The savings in on-line computational time of QKU PC-Radar over KU PC-Radar are significant because off-line computations of a small set of clutter covariance matrices permit their fast memory retrieves.

This disclosure in the preceding sections of this specification provides a review of the emergence of a fast and powerful adaptive radar method. A knowledge unaided or KU version of the prior art technique was provided that determined the PC from an on-line derived sample covariance matrix. It was then shown using taxing environmental conditions that both KA and KU PC-Radar yields a SINR radar performance that emulated that of a KA Optimum-Radar scheme. This was a welcome as well as extraordinary result. In the future the exposed synergistic PC-Radar ideas of this disclosure are expected to find extensive use in fields such as smart antennas, with applications not only found in radar but also in radio communications where non-stationary clutter interferences are the rule rather than the exception as the complexity and demands of wireless multi-media networks continuously increase.

APPENDIX A

Covariance Matrix Tapers

In this appendix covariance elements of the interference plus noise covariance matrix tapers model of (7)-(8) are defined. They are:

The Thermal White Noise Covariance:

The thermal white noise covariance ($C_n$) is defined according to:

$$C_n = \sigma_n^2 I_{NM} \quad (A.1)$$

where $\sigma_n^2$ is the average power of thermal white noise and $I_{NM}$ is an identity matrix of dimension NM by NM.

The Jammer Covariance:

The jammer covariance matrix ($C_J$) is defined according to:

$$C_J = \sum_{i=1}^{N_J} p_i g_i(\theta_t)(I_M \otimes 1_{N \times N}) O\big(j(\theta_J^i) \cdot j(\theta_J^i)^H\big) \quad (A.2)$$

$$j(\theta_J^i) = [j_1(\theta_J^i) j_2(\theta_J^i) \ldots j_M(\theta_J^i)]^T \quad (A.3)$$

$$j_k(\theta_J^i) = j_1(\theta_J^i) \text{ for } k = 1, \ldots, M \quad (A.4)$$

$$j_1(\theta_J^i) = [j_{1,1}(\theta_J^i) j_{2,1}(\theta_J^i) \ldots j_{N,1}(\theta_J^i)] \quad (A.5)$$

$$j_{k,1}(\theta_J^i) = e^{j2\pi(k-1)\bar{\theta}_J^i} \text{ for } k = 1, \ldots, N \quad (A.6)$$

$$\bar{\theta}_J^i = \frac{d}{\lambda}\sin(\theta_J^i) \quad (A.7)$$

where: 1) $N_J$ is the total number of jammers; 2) $\theta_J^i$ is the boresight angle of the $i^{th}$ jammer; 3) $\otimes$ is the Kronecker (or tensor) product; e) $I_M$ is an identity matrix of dimension M by M; f) $1_{N \times N}$ is a unity matrix of dimension N by N; g) $p_i$ is the $i^{th}$ jammer power; and h) $j(\theta_J^i)$ is the NM×1 dimensional and complex $i^{th}$ jammer steering vector.

Finally, the first element of the NM by NM matrix $C_J$ defines the jammer to noise ratio (JNR) which is $$JNR = C_J(1,1)/\sigma_n^2 \quad (A.8)$$

The Range Walk Covariance:

The range walk covariance ($C_{RW}$) is defined according to:

$$C_{RW} = C_{RW}^{time} \otimes C_{RW}^{space} \quad (A.9)$$

$$[C_R^{time}]_{i,k} = \rho^{|i-k|} \quad (A.10)$$

$$C_{RW}^{space} = 1_{N \times N} \quad (A.11)$$

$$\rho = \Delta A/A = \Delta A/\{\Delta R \Delta \theta\} = \Delta A/\{(c/B)\Delta \theta\} \quad (A.12)$$

where: a) c is the velocity of light; b) B is the bandwidth of the compressed pulse; c) $\Delta R$ is the range-bin radial width; d) $\Delta \theta$ is the mainbeam width; e) A is the area of coverage on the range bin associated with $\Delta \theta$ at the beginning of the range walk; f) $\Delta A$ is the remnants of area A after the range bin migrates during a CPI; and g) $\rho$ is the fractional part of A that remains after the range walk.

The Internal Clutter Motion Covariance:

The internal clutter motion covariance ($C_{ICM}$) is defined according to:

$$C_{ICM} = C_{ICM}^{time} \otimes C_{ICM}^{space} \quad (A.13)$$

$$[C_{ICM}^{time}]_{i,k} = \frac{r}{r+1} + \frac{1}{r+1}\frac{(b\lambda)^2}{(b\lambda)^2 + (4\pi|k-i|T_r)^2} \quad (A.14)$$

$$C_{ICM}^{space} = 1_{N \times N} \quad (A.15)$$

$$10\log_{10} r = -15.5\log_{10}\omega - 12.1\log_{10} f_c + 63.2 \quad (A.16)$$

where: a) $f_c$ is the carrier frequency in megahertz; b) $\omega$ is the wind speed in miles per hour; c) r is the ratio between the dc and ac terms of the clutter Doppler power spectral density; d) b is a shape factor that has been tabulated; e) c is the speed of light; and f) $T_r$ is the pulse repetition interval.

The Channel Mismatch Covariance:

The channel mismatch covariance ($C_{CM}$) found according to:

$$C_{CM} = C_{NB} \bigcirc C_{FB} \bigcirc C_{AD} \quad (A.17)$$

where $C_{NB}$, $C_{FB}$ and $C_{AD}$ are composite covariance matrix tapers that are defined next.

1. The Finite Bandwidth Covariance ($C_{FB}$):

This is a finite (nonzero) bandwidth (FB) channel mismatch type defined according to:

$$C_{FB} = C_{FB}^{time} \otimes C_{FB}^{space} \quad (A.18)$$

$$C_{FB}^{time} = 1_{M \times M} \quad (A.19)$$

$$[C_{FB}^{space}]_{i,k} = (1 - \Delta\varepsilon/2)^2 \mathrm{sinc}^2(\Delta\phi/2) \text{ for } i \neq k \quad (A.20)$$

$$[C_{FB}^{space}]_{i,i} = 1 - \Delta\varepsilon + \frac{1}{3}\Delta\varepsilon^2 \text{ for } i=1,\ldots,N \quad (A.21)$$

where $\Delta\varepsilon$ and $\Delta\phi$ denote the peak deviations of decorrelating random amplitude and phase channel mismatch, respectively. The square term in (A.20) corrects an error in the derivation of equation (A.21).

2. The Angle Dependent Covariance ($C_{AD}$):

This is an angle-dependent (AD) channel mismatch type:

$$C_{AD} = C_{AD}^{time} \otimes C_{AD}^{space} \quad (A.22)$$

$$C_{AD}^{time} = 1_{M \times M} \quad (A.23)$$

$$[C_{AD}^{space}]_{i,k} = \mathrm{sinc}\left(B|k-i|\frac{d}{\lambda f_c}\sin(\Delta\theta)\right) \text{ for } i \neq k \quad (A.24)$$

$$[C_{AD}^{space}]_{i,i} = 1 \quad (A.25)$$

where B is the bandwidth of an ideal bandpass filter and $\Delta\theta$ is a suitable measure of mainbeam width.

3. The Angle Independent Narrowband Covariance ($C_{NB}$):

This is an angle-independent narrowband or NB channel mismatch type:

$$C_{NB} = qq^H \quad (A.26)$$

$$q = [q_1 q_2 \ldots q_M]^T \quad (A.27)$$

$$q_k = q_1 \text{ for } k=1,\ldots,M \quad (A.28)$$

$$q_1 = [\varepsilon_1 e^{j\gamma_1} \varepsilon_2 e^{j\gamma_2} \ldots \varepsilon_N e^{j\gamma_N}] \quad (A.29)$$

where $\Delta\varepsilon_1, \ldots, \Delta\varepsilon_N$ and $\Delta\gamma_1, \ldots, \Delta\gamma_N$ denote amplitude and phase errors, respectively.

APPENDIX B

Derivation of the SCM Power Centroid Expressions

Figure 11:
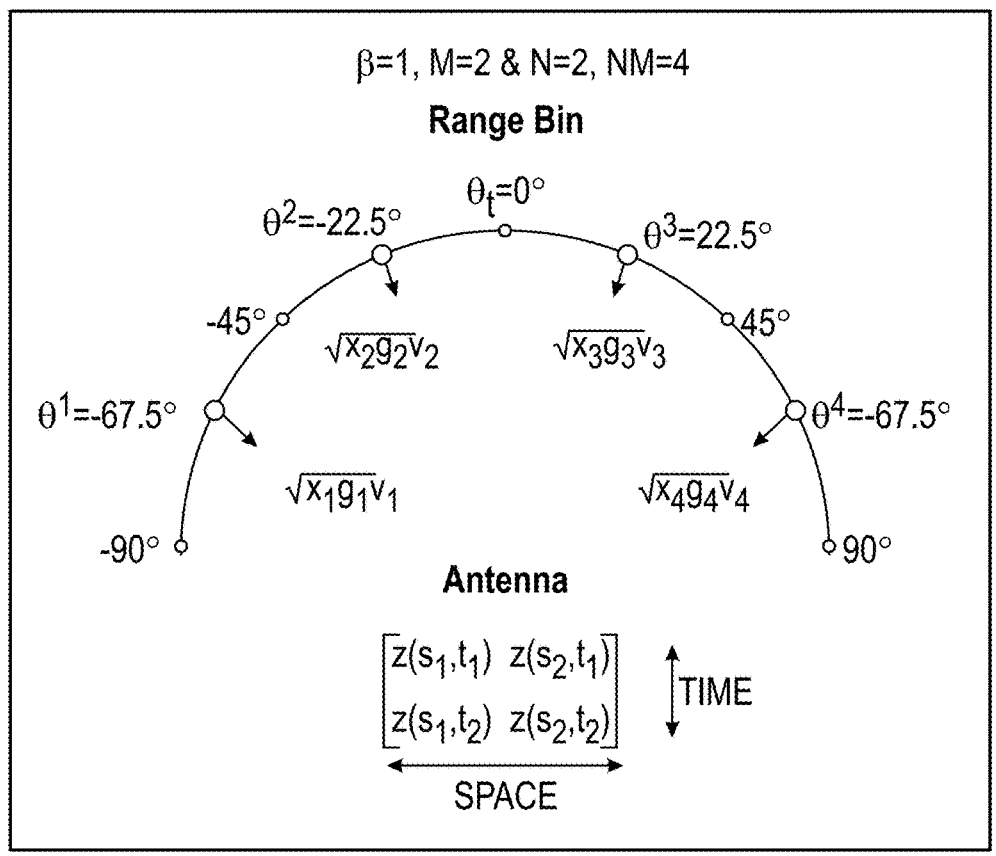
FIG. 11 depicts the SCM power-centroid expressions of equations (34), (35) and (36) using the optimum M=N=2 case.

The basic idea behind the SCM power-centroid expressions of (34), (35) and (36) is explained next using the optimum M=N=2 case depicted in Fig. B.1 for $\beta$=1 as motivation. This figure shows a range-bin made of NM=4 clutter cells which are symmetrically spaced with respect to the target that is being investigated at the boresight angle of $\theta_t$=0°. Thus we have that from the four boresight locations $\{\theta^1, \theta^2, \theta^3, \theta^4\}$ on the range-bin clutter returns are sent to the receiving two antenna elements that result in the steering vector expression $\{\sqrt{x_1 g_1} v_1, \sqrt{x_2 g_2} v_2, \sqrt{x_3 g_3} v_3, \sqrt{x_4 g_4} v_4\}$ where the sets $\{x_1, x_2, x_3, x_4\}$, $\{g_1, g_2, g_3, g_4\}$ and $\{v_1, v_2, v_3, v_4\}$ are the clutter, antenna gain and radial (or steering) velocities, respectively. Furthermore, the two antenna elements in this example produce during a the two pulses CPI two different measurements. All of these measurements are represented in FIG. 11 with the matrix $$\begin{bmatrix} z(s_1, t_1) & z(s_2, t_1) \\ z(s_1, t_2) & z(s_2, t_2) \end{bmatrix} \quad (B.1)$$

where the left element in each $(s_i, t_j)$ pair, i.e. $s_i$, indicates the $i^{th}$ antenna element and the right element $t_j$ denotes the $j^{th}$ received pulse during a CPI, while the four measurement values depicted on the matrix, i.e. $\{z(s_i, t_j)\}$, are a function of the received modulated steering vectors as shown below $$z = [z(s_1, t_1) \; z(s_1, t_2) \; z(s_2, t_1) \; z(s_2, t_2)]^T = \sum_{i=1}^{4} \sqrt{x_i g_i} \, v_i \quad (B.2)$$

with the four clutter steering vectors given by the expression $$v_i = [v_i(s_1, t_1) \; v_i(s_2, t_1) \; v_i(s_1, t_2) \; v_i(s_2, t_2)]^T = $$
$$\left[ 1 \; e^{j\frac{2\pi d}{\lambda}\sin\theta_1} \; e^{j\frac{2\pi d}{\lambda}\sin\theta_1} \; e^{j\frac{4\pi d}{\lambda}\sin\theta_1} \right]^T, i=1,\ldots,4. \quad (B.3)$$

Next an expression is found for the correlation matrix $E[xx^H]$ under the assumption that each clutter return is uncorrelated from each other, i.e. it is assumed that $E[\sqrt{x_i g_i}\sqrt{x_j g_j}]=0$ for $i \neq j$, and $E[\sqrt{x_i g_i}\sqrt{x_j g_j}]=x_i g_i$ for $i=j$. Thus it is found via straight forward algebraic manipulations and the symmetry condition $\theta_3 = -\theta_2 = 22.5°$ and $\theta_4 = -\theta_1 = 67.5°$ deduced from Fig. B.1 that $$E[xx^H] = \begin{bmatrix} M(t_1, t_1) & M(t_1, t_2) \\ M(t_2, t_1) & M(t_2, t_2) \end{bmatrix} = \quad (B.4)$$

$$\begin{bmatrix} M(t_1, t_1) & M(t_1, t_2) \\ M^*(t_1, t_2) & M(t_1, t_1) \end{bmatrix} = \begin{bmatrix} m_1 & m_2 & m_2 & m_3 \\ m_2^* & m_1 & m_1 & m_2 \\ m_2^* & m_3^* & m_1 & m_2 \\ m_1^* & m_2^* & m_2^* & m_1 \end{bmatrix}$$

$$M(t_1, t_1) = \begin{bmatrix} m_1 & m_2 \\ m_2^* & m_1 \end{bmatrix}, \quad (B.5)$$

$$M(t_1, t_2) = \begin{bmatrix} m_2 & m_3 \\ m_1 & m_2 \end{bmatrix}$$

where the three $2^{nd}$ order correlation moments in (B.5) are found from the following three expressions $$m_1 = x_1 g_1 + x_2 g_2 + x_3 g_3 + x_4 g_4 \quad (B.6)$$

$$m_2 = \quad (B.7)$$
$$x_1 g_1 e^{j\frac{2\pi d}{\lambda}\sin\theta_4} + x_2 g_2 e^{j\frac{2\pi d}{\lambda}\sin\theta_3} + x_3 g_3 e^{-j\frac{2\pi d}{\lambda}\sin\theta_3} + x_4 g_4 e^{-j\frac{2\pi d}{\lambda}\sin\theta_4}$$

and $$m_3 = \quad (B.8)$$
$$x_1 g_1 e^{j\frac{4\pi d}{\lambda}\sin\theta_4} + x_2 g_2 e^{j\frac{4\pi d}{\lambda}\sin\theta_3} + x_3 g_3 e^{-j\frac{4\pi d}{\lambda}\sin\theta_3} + x_4 g_4 e^{-j\frac{4\pi d}{\lambda}\sin\theta_4}$$

Next the moment expressions (B.6)-(B.8) are used to justify the general expression (34) for $PC_{KU}$ according to:

$$PC_{KU} = \frac{\sum_{i=1}^{NM} ix_i g_i^{\theta_t=0°}}{\sum_{i=1}^{NM} x_i g_i^{\theta_t=0°}} = \frac{NM+1}{2} + \Delta PC(R_{SCM}) \quad (B.9)$$

$$\Delta PC(R_{SCM}) = \frac{\sum_{i=2}^{N+M-1} k_i \text{Imag}[m_i]}{m_1} \quad (B.10)$$

This is done by first noticing that the power centroid for our N=M=2 case is given by:

$$PC_{KU} = \frac{\sum_{i=1}^{4} ix_i g_i}{\sum_{i=1}^{4} x_i g_i} = \frac{x_1 g_1 \cdot 1 + x_2 g_2 \cdot 2 + x_3 g_3 \cdot 3 + x_4 g_4 \cdot 4}{x_1 g_1 + x_2 g_2 + x_3 g_3 + x_4 g_4} \quad (B.11)$$

Then after some algebraic manipulation of (B.11) it follows that $$PC_{KU} = \frac{4+1}{2} + \frac{[1 \ 3]}{2m_1}\begin{bmatrix} x_3 g_3 - x_2 g_2 \\ x_4 g_4 - x_1 g_1 \end{bmatrix} \quad (B.12)$$

where the denominator of (B.11) now appears as $m_1$, see (B.6), in (B.12) and the first term to the right of (B.12) is given by $(NM+1)/2=(4+1)/2=2.5$. It is further noticed that $(NM+1)/2$ is the power centroid value corresponding to the boresight angle of 0° for the investigated target. Secondly it is also noticed from (B.12) that the power centroid value of $(NM+1)/2$ arises with symmetrically distributed antenna gain weighted clutter, i.e. when $x_3 g_3 = x_2 g_2$ and $x_4 g_4 = x_1 g_1$ or when the clutter difference closest to the target, i.e. $x_3 g_3 - x_2 g_2$, is equal to the negative of three times the clutter difference away form the target, i.e. $-3(x_4 g_4 - x_1 g_1)$.

We next use expressions (B.6)-(B.8) to derive the following relationships between the real and imaginary parts of $m_1$, $m_2$ and $m_3$ $$\begin{bmatrix} \text{Real}[m_1] \\ \text{Real}[m_2] \end{bmatrix} = \begin{bmatrix} 1 & 1 \\ \cos\left(\frac{2\pi d}{\lambda}\sin\theta_3\right) & \cos\left(\frac{2\pi d}{\lambda}\sin\theta_4\right) \end{bmatrix}\begin{bmatrix} x_3 g_3 + x_2 g_2 \\ x_4 g_4 + x_1 g_1 \end{bmatrix} \quad (B.13)$$

$$\begin{bmatrix} \text{Imag}[m_2] \\ \text{Imag}[m_3] \end{bmatrix} = -\begin{bmatrix} \sin\left(\frac{2\pi d}{\lambda}\sin\theta_3\right) & \sin\left(\frac{2\pi d}{\lambda}\sin\theta_4\right) \\ \sin\left(\frac{4\pi d}{\lambda}\sin\theta_3\right) & \sin\left(\frac{4\pi d}{\lambda}\sin\theta_4\right) \end{bmatrix}\begin{bmatrix} x_3 g_3 - x_2 g_2 \\ x_4 g_4 - x_1 g_1 \end{bmatrix} \quad (B.14)$$

Solving the linear system of equations (B.14) for the clutter differences vector under the constraint that the matrix must be invertible, and then substituting this result in (B.12) yields the desired optimum expression for the range-bin power-centroid $PC_{KU}$ in terms of the three correlation elements of $E[xx^H]$, i.e. $m_1$, $m_2$ and $m_3$, as follows $$PC_{KU} = \quad (B.15)$$

$$\frac{4+1}{2} - \frac{[1 \ 3]}{2m_1}\begin{bmatrix} \sin\left(\frac{2\pi d}{\lambda}\sin\theta_3\right) & \sin\left(\frac{2\pi d}{\lambda}\sin\theta_4\right) \\ \sin\left(\frac{4\pi d}{\lambda}\sin\theta_3\right) & \sin\left(\frac{4\pi d}{\lambda}\sin\theta_4\right) \end{bmatrix}^{-1}\begin{bmatrix} \text{Imag}[m_2] \\ \text{Imag}[m_3] \end{bmatrix}$$

To get an idea of the values derived for this simple and optimum case we evaluate (B.15) for the assumed symmetrical conditions of Fig. B.1 and under the assumption that $d/\lambda=0.5$ (also used in our simulations) to yield $$PC_{KU} = \frac{5}{2} - [2.10405 \quad -2.17625]\begin{bmatrix} \text{Imag}[m_2] \\ \text{Imag}[m_3] \end{bmatrix}/m_1 \quad (B.16)$$

This expression can then be rewritten as follows $$PC_{KU} = \frac{5}{2} + \sum_{i=2}^{3} k_i \text{Imag}[m_i]/m_1, \quad (B.17)$$

$$k_2 = -2.10405(-1)^2 \ \& \ k_3 = -2.17625(-1)^3$$

where a comparison of (34)-(36) with (B.17) should help explain why the "forms" of these expressions are being used for the high dimensionality example of Section IV, inclusive of the relative location in $E[xx^H]$ of the moments in (B.10), see (B.4) and FIG. 5 for the N=M=2 and N=M=3 locations, respectively.

APPENDIX C

Linger Thermo Theory

Linger thermo theory (LTT) studies physical mediums whose mass energy ($E=Mc^2$) is regulated, i.e., it is kept constant, while interacting with its surroundings via black body radiation. M denotes the medium mass, c the speed of light in a vacuum and E the medium energy.

1. Four System Functions Types

Four different types of system functions characterize all mediums. Two functions are "thermal-uncertainty space" types and two are "linger-certainty time" types. While the two thermal functions pertain to the "sourcing and retention" of mass-energy that are measured with entropy metrics, the two linger functions pertain to the "processing and motion" of mass-energy that are measured with ectropy metrics.

2. The Two Thermo Entropies and Two Linger Ectropies

The two thermo entropies and two linger ectropies are defined as follows:

The Boltzmann Thermo-Source Entropy:

The Boltzmann thermo-source entropy ($\hat{H}$) denotes the "amount of thermal-uncertainty bits" of the system microstates according to the following "expectation uncertainty metric" (in mathematical bit units):

$$\hat{H} = \Sigma_{i=1}^{\Lambda_{\hat{H}}} \log_2(1/P[\mu_i])P[\mu_i] = \log_2\Omega = S/k \ln 2 \quad (C.1)$$

where $\Lambda_{\hat{H}}$ is the number of realizations of a microstate $\mu_i$ (describing a microscopic configuration of a thermodynamics system occupied with probability $P[\mu_i]$ in the course of thermal fluctuations). The expression $\log_2(1/P[\mu_i])$ denotes the "amount of thermal-uncertainty bits" associated with $\mu_i$. In addition, $\log_2(1/P[\mu_i])$ denotes the smallest possible thermal-uncertainty bits for $\mu_i$. Moreover, $\Omega$ in $\hat{H}=\log_2\Omega$ denotes the 'effective' number of equally likely microstate realizations resulting in $\hat{H}$. When the microstates are equally likely it follows that $\Omega$ and $\Lambda_{\hat{H}}$ would be the same. Finally, $\hat{H}=\log_2\Omega=S/k \ln 2$ relates $\hat{H}$ to the Boltzmann "statistical" thermodynamics entropy (S) and constant (k), both in Joules/K units.

The Thermo-Retainer Entropy:

The thermo retainer entropy ($\hat{N}$) denotes the "amount of thermal-uncertainty square meters" of the system microstates according to the following "expectation uncertainty metric" (in physical SI m² units):

$$\hat{N}=\Sigma_{i=1}^{\Lambda_{\hat{H}}}4\pi\bar{r}_i^2 P[\mu_i]=4\pi r^2 \qquad (C.2)$$

where $\Lambda_{\hat{H}}$ is the number of realizations of a microstate $\mu_i$ and $\bar{r}_i$ is the expected radius of the sphere where $\mu_i$ resides when the expected shape of its volume is that of a sphere. The expression $4\pi\bar{r}_i^2$ denotes the "amount of thermal-uncertainty square meters" corresponding to the surface area of a $\mu_i$ spherical volume. In addition, $4\pi\bar{r}_i^2$ denotes the smallest possible thermal-uncertainty surface area that an arbitrarily shaped volume for $\mu_i$ could have, i.e., that of a sphere. Finally, r in $4\pi r^2$ denotes an average radius for all microstate spheres.

The Linger-Processor Ectropy:

The linger-processor ectropy ($\hat{K}$) denotes the "amount of linger-certainty bors" of the system microstates according to the following "minimax certainty metric" (in mathematical binary operator or bor units):

$$\hat{K} = \max\left\{\log_{C[\mu_1]} h_1, \dots, \log_{C[\mu_{\Lambda_{\hat{H}}}]} h_{\Lambda_{\hat{H}}}\right\} = \sqrt{h} \qquad (C.3)$$

where $\Lambda_{\hat{H}}$ is the number of realizations of a microstate $\mu_i$, $h_i$ is the number of bits for processing under $\mu_i$ and $C[\mu_i]$ is a "constraint" on the maximum number of inputs that a basic mathematical operator (or physical gate) can have under $\mu_i$. The expression $\log_{C[\mu_i]} h_i$ denotes the "amount of linger-certainty bors" associated with $\mu_i$ where the approximation $\log_{C[\mu_i]} h_i \cong \sqrt{h_i}$ holds when $C[\mu_i]$ approaches the value of one and $h_i$ is a very large number. In addition, $\log_{C[\mu_i]} h_i$ denotes the smallest possible amount of linger-certainty bors of processing under $\mu_i$. Finally under the condition $\log_{C[\mu_i]} h_i \cong \sqrt{h_i}$ for all i the h in $\hat{K}=\sqrt{h}$ denotes the maximum number of thermo-bit inputs linked to the microstate realization whose number of linger bors is the same as $\hat{K}$.

The Linger-Mover Ectropy:

The linger-mover ectropy ($\hat{A}$) denotes the "amount of linger-certainty seconds" of the system microstates according to the following "minimax certainty metric" (in physical SI sec units):

$$\hat{A}=\max\{\pi\bar{r}_1/v_1, \dots, \pi\bar{r}_{\Lambda_{\hat{H}}}/v_{\Lambda_{\hat{H}}}\}=\pi r/v \qquad (C.4)$$

where $\Lambda_{\hat{H}}$ is the number of realizations of a microstate $\mu_i$ and $\bar{r}_i$ is the expected radius of the sphere where $\mu_i$ resides when the expected shape of its volume is that of a sphere. The expression $\pi\bar{r}_i/v_i$ denotes the "amount of linger-certainty seconds" corresponding to circular rotational motion on the surface of a sphere of radius $\bar{r}_i$ with $v_i$ denoting the rotational speed of motion in $\mu_i$. In addition, $\pi\bar{r}_i/v_i$ denotes the smallest possible linger-certainty seconds for rotational motion since $v_i$ is the largest possible in value. Finally r and v in $A=\pi r/v$ denote the average radius and average rotational speed for all microstate spheres, respectively.

The Universal Linger Thermo Equation

The two entropies (C.1) and (C.2) and ectropies (C.3) and (C.4) when combined produce the universal linger thermo equation (ULTE) which is a "general medium operational expression":

$$\hat{H} = \log_2 \Omega = \qquad (C.5)$$

$$g_{Med}\left(\frac{\hat{N}}{\Delta\hat{N}} = \frac{V}{\Delta V} = \frac{\tau}{\Delta\tau} = \left(\frac{r}{\Delta r}\right)^2 = \left(\frac{M}{\Delta M}\right)^2 = \left(\frac{\hat{A}}{\Delta\hat{A}}\right)^2\right) = \hat{K}^2$$

where $g_{Med}$ is a function that depends in the type of medium studied (e.g., a black-hole, a photon-gas or a flexible-phase medium) that relates the source/processor metrics pair $(\hat{H},\hat{K})$, with mathematical units, to dimensionless operating ratios of physical variables, inclusive of the retainer/mover metrics pair $(\hat{N},\hat{A})$. An example of a dimensionless operating ratio is $M/\Delta M$ with $M=E/c^2$ denoting the mass-energy of the medium (whose value is regulated to remain constant) and $\Delta M$ denoting an active or operating part of M called the quantum of operation (QOO) mass. The following three relationships are next highlighted for the ULTE:

1) The "mathematical units" entropy/ectropy equality $$\hat{H}=\hat{K}^2 \qquad (C.6)$$

that surfaces from (C.3) when h is replaced with $\hat{H}$.

2) The "physical units" entropy/ectropy extended relationship $$\hat{N} = 4\pi r^2 = 3\frac{4\pi r^3/3}{r} = 3\frac{V}{r} = 4\pi\left(\frac{GM}{v^2}\right)^2 = \frac{3r}{r\Pi} = \frac{4v^2\hat{A}^2}{\pi} \qquad (C.7)$$

that surfaces from the use of: a) equations (C.2) and (C.4); b) the equation for the escape speed ($v_e$) from the medium:

$$v_e^2=2v^2=2GM/r \qquad (C.8)$$

and derived under the assumption that the expected shape of the medium is that of a sphere of radius r whose mass-energy $M=E/c^2$ is modeled as a point mass residing at its center (v denotes the perpetual rotational speed linked to the assumed point mass); and c) the equation of the "life-bits pace ($\Pi$)" defined according to (in SI sec/m³ units):

$$\Pi=\tau/V=3\tau/r\hat{N} \qquad (C.9)$$

where $\tau$ is the retention time of "thermo-bits of interest (or life-bits)" that defines a portion of the medium that leaves its expected spherical volume (V) via black-body radiation never to return. An example of "life-bits for a non-living system" are the thermo-bits of some compressed image such as the SAR image of FIG. 8c, residing in a medium that also contains the thermo-bits of the PT source-coder that derived the image. Another example is of "life-bits for a living system" responsible for the day to day survival of an organism in a medium that also contains the thermo-bits that give the organism structure.

3) The "physical units" QOO composite expression $$\Delta\hat{N} = 4\pi\Delta r^2 = 3\frac{4\pi\Delta r^2/3}{r} = 3\frac{\Delta V}{r} = 4\pi\left(\frac{G\Delta M}{v^2}\right)^2 = \frac{3\Delta\tau}{r\Pi} = \frac{4v^2\Delta\hat{A}^2}{\pi} \qquad (C.10)$$

that is appropriately derived from (C.7).

Three ULTE Examples

The ULTE is now stated for an uncharged and non-rotational black-hole, photon-gas and flexible-phase mediums, with their least "surface area" LTT expected volumes noted to be spherical in shape.

The Black-Hole ULTE:

The black-hole (BH) ULTE is given:

$$\hat{H}_{BH} = \frac{\hat{N}_{BH}}{\Delta \hat{N}_{BH}} = \quad (C.11)$$

$$\frac{V_{BH}}{\Delta V_{BH}} = \frac{\tau_{BH}}{\Delta \tau_{BH}} = \left(\frac{r_{BH}}{\Delta r_{BH}}\right)^2 = \left(\frac{M_{BH}}{\Delta M_{BH}}\right)^2 = \left(\frac{\hat{A}_{BH}}{\Delta \hat{A}_{BH}}\right)^2 = \hat{K}_{BH}^2$$

$$\Delta \hat{N}_{BH} = \frac{1920\ln 2}{\chi^c} = 7.2534 \times 10^{-70} m^2 \quad (C.12)$$

$$S_{BH} = k\frac{4\pi G}{c^5\hbar}E_{BH}^2 = k\frac{\chi^c}{1920}\hat{N}_{BH} = k\ln 2 \hat{H}_{BH} = k\ln 2 \frac{\hat{N}_{BH}}{\Delta \hat{N}_{BH}} = \ldots \quad (C.13)$$

$$kT_{BH} = \left(\frac{\partial (S_{BH}/k)}{\partial E_{BH}}\right)^{-1} = k\frac{E_{BH}}{2S_{BH}} = \frac{c^5\hbar}{8\pi G E_{BH}} \quad (C.14)$$

$$\chi = \frac{\tau_{BH}}{V_{BH}} = 480\frac{c^2}{\hbar G} = 6.1203 \times 10^{63} s/m^3 \quad (C.15)$$

$$\Delta \tau_{BH} = 640\ln 2 r_{BH}/c \quad (C.16)$$

$$\Delta M_{BH} = \ln 2 c\hbar/4\pi G = 5.1152 \times 10^{-9} \text{ kg} \quad (C.17)$$

$$\diamond E_{\Delta \tau_{BH}}^{LB=1} = \diamond M_{\Delta \tau_{BH}}^{LB=1} c^2 = \left(1 - \sqrt[3]{1 - \Delta M_{BH}^2/M_{BH}^2}\right) M_{BH}c^2 \quad (C.18)$$

where all the variables were either implicitly or explicitly defined earlier in (C.1)-(C.10) except for: a) $T_{BH}$ denoting the temperature of the black-hole; b) G denoting the gravitational constant; c) $\hbar$ denoting the reduced Planck constant; d) □ denoting the "pace of dark in a black hole" ($\chi$ is the retention dual of motion's "speed of light in a vacuum c", noted from (C.15) to be the ratio of the duration of life-bits in the black-hole ($\tau_{BH}$) over its initial volume $V_{BH}$—with all the thermo-bits in this volume assumed to be life-bits, i.e., thermo-bits of interest, whose radiation by the black-hole decreases its mass-energy until it completely evaporates); and e) $\diamond E_{\Delta \tau_{BH}}^{LB=1}$ denotes the quantum of radiation (QOR) energy of the "single" life-bit emitted during the black-hole QOO lifespan $\Delta \tau_{BH}$.

The Photon-Gas ULTE:

The photon-gas ULTE is defined according to:

$$\hat{H}_{PG} = \frac{\hat{N}_{PG}}{\Delta \hat{N}_{PG}} = \quad (C.19)$$

$$\frac{V_{PG}}{\Delta V_{PG}} = \frac{\tau_{PG}}{\Delta \tau_{PG}} = \left(\frac{r_{PG}}{\Delta r_{PG}}\right)^2 = \left(\frac{M_{PG}}{\Delta M_{PG}}\right)^2 = \left(\frac{\hat{A}_{PG}}{\Delta \hat{A}_{PG}}\right)^2 = \hat{K}_{PG}^2$$

$$\Delta \hat{N}_{PG} = \ln 2 \frac{135c^3\hbar^3}{4\pi^2(kT)^3 r_{PG}} \quad (C.20)$$

$$S_{PG} = k\frac{16\pi^3(kT_{PG})^3 G^3 E_{PG}^3}{135c^9\hbar^3 v_{PG}^6} = \quad (C.21)$$

$$k\frac{4\pi^2(kT_{PG})^3 r_{PG}}{135c^3\hbar^3}\hat{N}_{PG} = k\ln 2 \hat{H}_{PG} = k\ln 2\frac{\hat{N}_{PG}}{\Delta \hat{N}_{PG}} = \ldots$$

$$kT_{PG} = \left(\frac{\partial (S_{PG}/k)}{\partial E_{PG}}\right)^{-1} = k\frac{E_{PG}}{3S_{PG}} = \frac{135c^9\hbar^3 v_{PG}^6}{48\pi^3(kT_{PG})^3 G^3 E_{PG}^2} \quad (C.22)$$

where all the variables in (C.19)-(C.22) were earlier defined, and when applicable are redefined in the context of a photon-gas medium.

The Flexible-Phase ULTE:

The flexible-phase ULTE is defined according to:

$$\hat{H} = J\log_2\left(\frac{\hat{N}}{\Delta \hat{N}} = \frac{V}{\Delta V} = \frac{\tau}{\Delta \tau} = \left(\frac{r}{\Delta r}\right)^2 = \left(\frac{M}{\Delta M}\right)^2 = \left(\frac{\hat{A}}{\Delta \hat{A}}\right)^2\right) = \hat{K}^2 \quad (C.23)$$

$$\Delta \hat{N} = \quad (C.24)$$

$$\frac{J}{g}\left(\frac{\beta c_V JkT}{E}\right)^{\beta c_V}\left(\left(\frac{2\pi\hbar^2}{mkT}\right)^{3/2}\frac{1}{V}\right)^{1/\beta} \hat{N} = \frac{3^{1/\beta}J}{(4\pi)^{1/\beta-1}r^{3/\beta-2}}\left(\frac{2\pi\hbar}{mkT}\right)^{3/2\beta}$$

$$S/k = \quad (C.25)$$

$$\ln\Omega = J\ln\left(\frac{g}{J}\left(\frac{E}{\beta c_V JkT}\right)^{\beta c_V}\left(\left(\frac{mkT}{2\pi\hbar^2}\right)^{3/2}V\right)^{1/\beta} = \frac{\hat{N}}{\Delta \hat{N}} = \ldots\right) = \ln 2\hat{H}$$

$$kT = \left(\frac{\partial (S/k)}{\partial E}\right)^{-1} = k\frac{1}{\beta c_V} \quad (C.26)$$

$$\ln\left(\frac{g}{J}\left(\frac{E}{\beta c_V JkT}\right)^{\beta c_V}\left(\left(\frac{mkT}{2\pi\hbar^2}\right)^{3/2}V\right)^{1/\beta} = \frac{\hat{N}}{\Delta \hat{N}} = \ldots\right)\frac{E}{S} = \frac{E}{\beta c_V J}$$

$$S = J\frac{\Delta S}{\Delta J} = J\frac{Q/T}{\Delta M/\Delta m} = \quad (C.27)$$

$$kJ\frac{Q}{(\Delta M/\Delta m)kT} = kJ\frac{\diamond E_{\Delta \tau}^Q}{\diamond E_{\Delta \tau}^{LB}} = kJ\ln\frac{\tau}{\Delta \tau} = \ldots = k\ln 2\hat{H}$$

$$N_{\Delta \tau}^{LB} = \diamond E_{\Delta \tau}^{LB}/\diamond E_{\Delta \tau_{BH}}^{LB=1} \quad (C.28)$$

where: 1) g denotes the degeneracy of the ground energy state of the medium, e.g., for a water medium it has a value of one; 2) T denotes the medium temperature, e.g., T=310 K for liquid water (this special medium will be used here to model that of a 70 kg individual since more than 98% of our molecules are those of water which together contribute to more than 65% of our total mass); 3) m denotes the mass of a "massive particle" such as an atom or molecule, e.g., m=3×10$^{-26}$ kg for a H$_2$O molecule; 4) $c_V$ is the heat capacity of a medium with constant volume, e.g., $c_V$=3 for liquid water at 310 K; 5) $\beta$ is a DoF coupling constant that acts as a 'compression' factor on the heat capacity of the medium and reflects non-equilibrium thermal conditions, e.g., $\beta$=0.7081 would lead to the compressed heat capacity of $\beta c_V$=2.1243 for our example; 6) $sc_V kT$ denotes the energy of a theoretical "thermal-energy particle", e.g., $\beta c_V kT$=9.0922×10$^{-21}$ Joules for our running example (as a means of comparison the energy of an electron is of 8.187× 10$^{-14}$ Joules); 7) E=Mc$^2$ is the "internal mass-energy" of the medium, e.g., for 70 kg of water, i.e., M=70 kg, one derives E=6.28×10$^{18}$ Joules (as a means of comparison the internal energy (U) for an ideal gas model, which unlike the LTT flexible-phase model does not include the medium mass-energy, is given by U=$c_V$kTM/m=10$^8$ Joules when T=1045 K and the $c_V$, M and m values are those of our running example); 8) J=E/$\beta c_V$kT is the number of thermal-energy particles in E, e.g., J=6.9193×10$^{38}$ for our example; 9) Q is the QOO heat energy entering the medium during $\Delta\tau$, e.g., Q=7.5825×10$^6$ Joules for a human consuming 1,814 kcal per day where $\Delta\tau$=1 day and the conversion factor of $\mu$=4.18 Joules/cal is used; 10) $\Delta$S=Q/T is the Classius entropy contributed to the medium at temperature T by Q during $\Delta\tau$; e.g., $\Delta$S=2.446×10$^4$ Joules/K for our example; 11) $\Delta$M=Q/$\Theta\mu$ is the mass equivalent for the energy Q that is expressed as the ratio of Q to the product of $\Sigma$ and $\mu$ with $\Theta$=5,000 kcal/kg and $\mu$=4.18 Joules/cal, e.g., $\Delta M$=0.3628 kg for our example; 12) $\Delta m$=kT ln($\tau/\Delta\tau$)/$\Theta\mu$, denotes a fraction of the massive particle m (or QOO m) that is expressed as the ratio of the lifespan-weighted thermal-energy term kT ln($\tau/\Delta\tau$) to product of $\Theta$ and $\mu$, e.g., $\Delta m$=2.1538×10$^{-27}$ kg when $\Delta\tau$=1 day=1/365 year and the lifespan ($\tau$) of the life-bits in the medium is of 102 years (as a means of comparison the mass of a hydrogen atom $(m_H)$ is 1.6667×10$^{-27}$ kg); 13) $\Diamond E_{\Delta\tau}{}^Q$=Q is the QOR energy that leaves the medium during $\Delta\tau$ and is the same as the operating heat energy Q that enter it (this operation is a control or compensating action from the surroundings of the medium that maintains the medium mass-energy E=Mc$^2$ constant with the passing of time); 14) $\Delta J$=$\Delta M/\Delta m$=Q/kT ln($\tau/\Delta\tau$) denotes the fraction of the total number of thermal-energy particles J of the medium which equals the ratio of $\Delta M$ to $\Delta m$ or equivalently the ratio of Q to kT ln($\tau/\Delta\tau$), e.g., $\Delta J$=1.6831×10$^{26}$ for our running example; 15) $\Diamond E_{\Delta\tau}{}^{LB}$=$\Delta$JkT=$\Diamond E_{\Delta\tau}{}^Q$/ln($\tau/\Delta\tau$) denotes a 'life-bits (LBs) energy' fraction of the QOR radiation energy ($\Delta E_{\Delta\tau}{}^Q$) with the fraction factor given by the reciprocal of the lifespan expression ln($\tau/\Delta\tau$), e.g., $\Diamond E_{\Delta\tau}{}^{LB}$=7.2082×10$^5$ Joules for our running example which is 9.5% of the total emitted radiation $\Diamond E_{\Delta\tau}{}^Q$; and 16) $N_{\Delta\tau}{}^{LB}$=$\Diamond E_{\Delta\tau}{}^{LB}$/$\Diamond E_{\Delta\tau_{BH}}{}^{LB=1}$ denotes a "hypothetical black-hole based" number of life-bits that leave the medium during $\Delta\tau$, and is defined as the "QOR energy ratio" of the life-bits energy ($\Diamond E_{\Delta\tau}{}^{LB}$) that leaves the medium during $\Delta\tau$ over the QOR energy ($\Diamond E_{\Delta\tau_{BH}}{}^{LB=1}$) of the single life-bit that leaves a black-hole over its QOO lifespan $\Delta\tau_{BH}$=640 ln 2$r_{BH}$/c with the mass of the black-hole being the same as that of the flexible-phase medium, e.g., $N_{\Delta\tau}{}^{LB}$=64×10$^6$ bits=8 Mbytes where from (C.18) one finds $\Diamond E_{\Delta\tau_{BH}}{}^{LB=1}$=0.0112 Joules for our running example. It is also of interest to note that for our running example the number of life-bits $N_{\Delta\tau}{}^{LB}$ (or QOR energy ratio) is close to 90% of the "QOO mass ratio" $\Delta M/\Delta M_{BH}$=71×10$^6$ where the QOO mass $\Delta M$ is 0.3628 kg and $\Delta M_{BH}$ is the black-hole's fixed QOO mass of 5.1152×10$^{-9}$ kg, see (C.17).

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "service," "circuit," "circuitry," "module," and/or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a non-transient computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code and/or executable instructions embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In one embodiment, the processes and devices described in preceding sections of this specification are used in conjunction with a moving target indicator radar system and/or with one or more of the components associated therewith. These systems are well known to those skilled in the art and are described, e.g., in U.S. Pat. No. 2,811,715 (moving target indicator radar); U.S. Pat. No. 2,965,895 (two antenna airborne moving target search radar); U.S. Pat. No. 3,153,786 (moving target indicator canceller); U.S. Pat. No. 3,634,859 (moving target indicator with automatic clutter residue control), U.S. Pat. No. 3,781,882 (adaptive digital automatic gain control for MTI radar systems), U.S. Pat. No. 3,879,729 (moving target indicator system with a cancellation filter), U.S. Pat. No. 3,962,704 (moving target indicator clutter tracker), U.S. Pat. No. 7,903,024 (adaptive moving target indicator clutter rejection), and the like. The entire disclosure of each of these United States patents is hereby incorporated by reference into this specification.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A radio signal processing system comprising:
   an antenna for receiving a radio signal, wherein the antenna operates according to a mathematical antenna pattern (MAP);
   a processor for processing the radio signal, the processor configured to perform a method for time compressed signal processing of the radio signal, the method comprising the steps of:
   receiving the radio signal using the antenna;
   calculating moments of a covariance matrix ($R_{SCM}$) of the radio signal, wherein the covariance matrix ($R_{SCM}$) is given by:

$$R_{SCM} = \frac{1}{n}\sum_{i=1}^{n} Z_i Z_i^H$$

wherein $\{Z_i=[z_{i,1}, z_{i,2}, \ldots, z_{i,NM}]: i=1, \ldots, n\}$ and n denotes measured samples, each sample being NM dimensional, wherein N is number of antenna elements and M is number of transmitted antenna pulses during a coherent pulse interval (CPI); and H denotes a vector complex conjugate;
   calculating a knowledge unaided power centroid ($PC_{KU}$) for the radio signal using the moments of the covariance matrix ($R_{SCM}$), wherein the knowledge unaided power centroid ($PC_{KU}$) is given by:

$$PC_{KU} = \frac{NM+1}{2} + \Delta PC(R_{SCM})$$

wherein NM is a mathematical product of N and M and (NM+1)/2 is a value that $PC_{KU}$ achieves when interference is stationary;
   correcting the mathematical antenna pattern (MAP) to produce a digitally corrected antenna pattern by mathematically adjusting the mathematical antenna pattern (MAP) toward the knowledge unaided power centroid ($PC_{KU}$) by a covariance matrix-dependent clutter correction $\Delta PC(R_{SCM})$ corresponding to normalized clutter covariances, wherein $PC(R_{SCM})$ is given by $$\Delta PC(R_{SCM}) = \frac{\sum_{i=2}^{N+M-1} k_i \text{Imag}[m_i]}{m_1}$$

$\{m_1, m_2, \ldots, m_{N+M-1}\}$ denotes a set of N+M−1 first row elements of a complex NM×NM of the covariance matrix ($R_{SCM}$) and Imag[$m_i$] denotes the imaginary part of the $m_i$ moment, $\{k_i; i=2, \ldots, N+M-1\}$ is a set of gains that weights contribution of Imag [$m_i$]; i=2, . . . , N+M−1;
   processing the radio signal in accordance with the digitally corrected antenna pattern.

2. The method as recited in claim 1, wherein the covariance matrix ($R_{SCM}$) is dynamic, and the step calculating the knowledge unaided power centroid ($PC_{KU}$) is performed dynamically as the covariance matrix ($R_{SCM}$) changes.

3. The method as recited in claim 1, wherein the covariance matrix ($R_{SCM}$) is dynamic, and the step calculating the knowledge unaided power centroid ($PC_{KU}$) is performed dynamically in real-time as the covariance matrix ($R_{SCM}$) changes.

4. The system as recited in claim 2, wherein the antenna is a linear array antenna and the mathematical antenna pattern (MAP) is a uniform linear array (ULA).

5. The system as recited in claim 2, wherein the radio signal is a radar signal and the knowledge unaided power centroid ($PC_{KU}$) is calculated without synthetic aperture radar (SAR) imagery.

6. The system as recited in claim 1, wherein the set of N+M−1 first row elements are second order statistical moments.

7. A moving target indicator (MTI) radar system comprising
   an antenna for receiving a radar signal, wherein the antenna operates according to a mathematical antenna pattern (MAP);
   a processor for processing the radar signal, the processor configured to perform a method for time compressed signal processing of the radar signal, the method comprising the steps of:
   processing the radar signal received from the antenna,
   dynamically calculating moments of a covariance matrix ($R_{SCM}$) of the radar signal as a moving target changes position, wherein the covariance matrix ($R_{SCM}$) is given by:

$$R_{SCM} = \frac{1}{n}\sum_{i=1}^{n} Z_i Z_i^H$$

wherein $\{Z_i=[z_{i,1}, z_{i,2}, \ldots, z_{i,NM}]: i=1, \ldots, n\}$ and n denotes measured samples, each sample being NM dimensional, wherein N is number of antenna elements and M is number of transmitted antenna pulses during a coherent pulse interval (CPI); and H denotes a vector complex conjugate;
   dynamically calculating a knowledge unaided power centroid ($PC_{KU}$) for the radar signal using the moments of the covariance matrix ($R_{SCM}$), wherein the knowledge unaided power centroid ($PC^{KU}$) is given by:

$$PC_{KU} = \frac{NM+1}{2} + \Delta PC(R_{SCM})$$

wherein NM is a mathematical product of N and M and (NM+1)/2 is a value that $PC_{KU}$ achieves when interference is stationary;

dynamically correcting the mathematical antenna pattern (MAP) to produce a digitally corrected antenna pattern by mathematically adjusting the mathematical antenna pattern (MAP) toward the knowledge unaided power centroid ($PC_{KU}$) by a covariance matrix-dependent clutter correction $\Delta PC(R_{SCM})$ corresponding to normalized clutter covariances, wherein $PC(R_{SCM})$ is given by $$\Delta PC(R_{SCM}) = \frac{\sum_{i=2}^{N+M-1} k_i \mathrm{Imag}[m_i]}{m_1}$$

$\{m_1, m_2, \ldots, m_{N+M-1}\}$ denotes a set of N+M−1 first row elements of a complex NM×NM of the covariance matrix ($R_{SCM}$) and $\mathrm{Imag}[m_i]$ denotes the imaginary part of the $m_i$ moment, $\{k_i; i=2, \ldots, N+M-1\}$ is a set of gains that weights contribution of $\mathrm{Imag}[m_i]; i=2, \ldots, N+M-1$;

dynamically processing the radar signal in accordance with the digitally corrected antenna pattern.

8. The system as recited in claim 7, wherein the antenna is a linear array antenna and the mathematical antenna pattern (MAP) is a uniform linear array (ULA).

9. The system as recited in claim 7, wherein the radar signal received from the antenna comprises a normalized steering vector (s) of the moving target and an interference plus noise vector (x).

10. The system as recited in claim 9, wherein the processor calculates a scalar output (y) by multiplying each of the normalized steering vector (s) of the moving target and the interference plus noise vector (x) by a weighting vector (w).

11. The system as recited in claim 7, wherein the radar signal comprises interference selected from the group consisting of range walk interference, clutter interference, jammer interference, internal-clutter motion interference, channel mismatch interference, antenna array misalignment angle ($\theta_{AAM}$) interference, and combinations thereof.

12. The system as recited in claim 7, wherein the set of N+M−1 first row elements are second order statistical moments.

13. The system as recited in claim 7, wherein the knowledge unaided power centroid ($PC_{KU}$) is calculated without synthetic aperture radar (SAR) imagery.

14. A radio signal processing system comprising:
an antenna for receiving a radio signal, wherein the antenna operates according to a mathematical antenna pattern (MAP) comprising a plurality of MAP patterns for a corresponding plurality of angles;
a data storage device that has a stored list of matrix-dependent clutter corrections $\Delta PC(R_{SCM})$ corresponding to normalized clutter covariances, each $\Delta PC(R_{SCM})$ correlating with a stored list of angles $\theta'$ the $\Delta PC(R_{SCM})$ given by $$\Delta PC(R_{SCM}) = \frac{\sum_{i=2}^{N+M-1} k_i \mathrm{Imag}[m_i]}{m_1}$$

wherein $\{m_1, m_2, \ldots, m_{N+M-1}\}$ denotes a set of N+M−1 first row elements of a complex NM×NM of a covariance matrix ($R_{SCM}$) and $\mathrm{Imag}[m_i]$ denotes the imaginary part of the $m_i$ moment, $\{k_i; i=2, \ldots, N+M-1\}$ is a set of gains that weights contribution of $\mathrm{Imag}[m_i]; i=2, \ldots, N+M-1$, wherein N is number of antenna elements and M is number of transmitted antenna pulses during a coherent pulse interval (CPI); the covariance matrix ($R_{SCM}$) given by:

$$R_{SCM} = \frac{1}{n}\sum_{i=1}^{n} Z_i Z_i^H$$

wherein $\{Z_i = [z_{i,1}, z_{i,2}, \ldots, z_{i,NM}]: i=1, \ldots, n\}$ and n denotes measured samples, each sample being NM dimensional, and H denotes a vector complex conjugate;

a processor for processing the radio signal, the processor configured to perform a method comprising steps of
receiving a presumed target signal at a power centroid angle $\theta$;
selecting a selected MAP pattern from the plurality of MAP patterns that corresponds to the power centroid $\theta$;
comparing the power centroid angle $\theta$ to the stored list of angles $\theta'$;
selecting a selected matrix-dependent clutter correction $\Delta PC(R_{SCM})$ from the stored list of matrix-dependent clutter corrections $\Delta PC(R_{SCM})$ that correlates with the angle $\theta'$ that is closest to the power centroid angle $\theta$,
correcting the selected MAP pattern off-line to produce a digitally corrected antenna pattern by mathematically adjusting the MAP pattern toward a knowledge unaided power centroid ($PC_{KU}$) by the selected covariance matrix-dependent clutter correction $\Delta PC(R_{SCM})$, wherein the knowledge unaided power centroid ($PC_{KU}$) is given by:

$$PC_{KU} = \frac{NM+1}{2} + \Delta PC(R_{SCM})$$

wherein NM is a mathematical product of N and M and (NM+1)/2 is a value that $PC_{KU}$ achieves when interference is stationary;

processing the radio signal in accordance with the digitally corrected antenna pattern.

* * * * *